US006968425B2

(12) United States Patent
Hashimoto

(10) Patent No.: US 6,968,425 B2

(45) Date of Patent: Nov. 22, 2005

(54) COMPUTER SYSTEMS, DISK SYSTEMS, AND METHOD FOR CONTROLLING DISK CACHE

(75) Inventor: Akiyoshi Hashimoto, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 393 days.

(21) Appl. No.: 10/373,044

(22) Filed: Feb. 26, 2003

(65) Prior Publication Data

US 2004/0123068 A1 Jun. 24, 2004

(30) Foreign Application Priority Data

Dec. 19, 2002 (JP) ............................ 2002-367454

(51) Int. Cl.[7] ............................................... G06F 12/00

(52) U.S. Cl. ........................ 711/113; 711/122; 711/133

(58) Field of Search ........................ 711/112, 113, 114, 711/122, 133; 709/223; 714/2, 4, 5, 6, 42, 714/43

(56) References Cited

U.S. PATENT DOCUMENTS

| | | | |
|---|---|---|---|
| 5,089,958 A | 2/1992 | Horton et al. | |
| 5,581,736 A * | 12/1996 | Smith | 711/170 |
| 5,586,291 A | 12/1996 | Lasker et al. | |
| 5,606,706 A | 2/1997 | Takamoto et al. | |
| 5,668,943 A | 9/1997 | Attanasio et al. | |
| 5,724,501 A | 3/1998 | Dewey et al. | |
| 6,105,103 A | 8/2000 | Courtright, II et al. | |
| 6,173,413 B1 | 1/2001 | Slaughter et al. | |
| 6,330,690 B1 | 12/2001 | Nouri et al. | |
| 6,338,112 B1 | 1/2002 | Wipfel et al. | |
| 6,393,518 B2 | 5/2002 | Koivuniemi | |
| 6,567,889 B1 | 5/2003 | DeKoning et al. | |
| 6,578,160 B1 | 6/2003 | MacHardy, Jr. et al. | |
| 6,609,184 B2 | 8/2003 | Bradshaw et al. | |
| 6,691,209 B1 | 2/2004 | O'Connell | |
| 2001/0013102 A1 | 8/2001 | Tsuchiya et al. | |

(Continued)

FOREIGN PATENT DOCUMENTS

| | | |
|---|---|---|
| JP | 3271823 | 12/1991 |
| JP | 04-313126 | 11/1992 |
| JP | 07-152651 | 6/1995 |
| JP | 2002-024069 | 1/2002 |
| WO | WO97/10552 | 3/1997 |

OTHER PUBLICATIONS

InfiniBand Architecture Specification vol. 1, Release 1.0.a, Jun. 19, 2001. pp. 1-114.

*Primary Examiner*—Kevin Verbrugge

(74) *Attorney, Agent, or Firm*—Mattingly, Stanger, Malur & Brundidge, P.C.

(57) ABSTRACT

Disclosed is a system and method for reducing an overhead of storing a log of each host processor in a cluster system that includes a plurality of host processors. Part of a disk cache of a disk system shared by the plurality of host processors is used as a log storage area. In order to make this possible, the disk system is provided with an interface enabled to be referred to and updated from each of the host processors separately from an ordinary I/O interface. A storage processor controls an area of the disk cache used for ordinary I/O processes by means of a disk cache control table. And a storage processor controls a log area allocated in the disk cache by means of an exported segments control table. The disk cache area registered in the exported segments control table is mapped into the virtual address space of the main processor by an I/O processor.

18 Claims, 18 Drawing Sheets

U.S. PATENT DOCUMENTS

| | | | |
|---|---|---|---|
| 2002/0073276 | A1 | 6/2002 | Howard et al. |
| 2002/0099907 | A1 | 7/2002 | Castelli et al. |
| 2003/0028819 | A1 | 2/2003 | Chiu et al. |
| 2003/0041280 | A1 | 2/2003 | Malcolm et al. |
| 2003/0200487 | A1 | 10/2003 | Taninaka et al. |
| 2003/0229757 | A1 | 12/2003 | Hosoya et al. |
| 2004/0019821 | A1 | 1/2004 | Chu et al. |
| 2004/0078429 | A1 | 4/2004 | Percival |

* cited by examiner

| Virtual address | Physical address | Memory size | Memory handle |
| --- | --- | --- | --- |
| 0xfc000000_00000000 | 0x80000000 | 64 KB | 0x0000 |
| 0x00000024_00000000 | 0x00040000 | 32 KB | 0x0040 |
| ⋮ | ⋮ | ⋮ | ⋮ |

| Disk number | Segment number | Disk cache address | | Cache status |
|---|---|---|---|---|
| 64 | 2048 | 0x00000000_00000000 | — | clean |
| 125 | 128 | 0x00000000_000 10000 | 0x00000008_0001 0000 | dirty |
| 640 | 514 | 0x00000000_00030000 | — | clean |
| 640 | 515 | 0x00000000_00040000 | — | dirty |
| ⋮ | ⋮ | ⋮ | ⋮ | ⋮ |

805 806 807 808

— : null

| number | Free disk cache segment address |
|---|---|
| 0 | 0x00000000_00020000 |
| 1 | 0x00000000_00050000 |
| 2 | 0x00000000_00060000 |
| ⋮ | ⋮ |

| Memory handle | Host identifier | Disk cache address | | Share mode bit | Allocation size |
|---|---|---|---|---|---|
| 0x0000 | 0x04 | 0x00000000_00000000 | 0x00000008_003 10000 | 0xffff | 64KB |
| 0x0001 | 0x08 | 0x00000000_000 10000 | 0x00000008_000 10000 | 0x0000 | 32KB |
| 0x0002 | 0x0c | 0x00000000_00030000 | 0x00000012_040 80000 | 0xff00 | 64KB |
| | | 0x00000000_00040000 | 0x00000012_040a0000 | 0xff00 | 16KB |
| ⋮ | ⋮ | ⋮ | ⋮ | ⋮ | ⋮ |

| Virtual address | Physical address | | Allocation size | Memory handle |
|---|---|---|---|---|
| 0xfc000000_00000000 | 0x00000000_0000c000 | 0x00000010_80000000 | 64KB | 0x0012 |
| 0x00000024_00000000 | 0x00000000_00004000 | 0x00000010_00800000 | 64KB | 0x0204 |
| | 0x00000000_08000000 | 0x00000010_00200000 | 32KB | |
| ⋮ | ⋮ | ⋮ | ⋮ | ⋮ |

1105 1106 1107

1813

| Host identifier (2001) | offset (2002) | Take-over host identifier (2003) |
| --- | --- | --- |
| 0x00 | 0x0000 | – |
| 0x01 | 0x1000 | 0x00 |
| ⋮ | ⋮ | ⋮ |

2004, 2005

— : null

COMPUTER SYSTEMS, DISK SYSTEMS, AND METHOD FOR CONTROLLING DISK CACHE

BACKGROUND OF THE INVENTION

1. Field of the Invention

The present invention relates to computer systems. More particularly, the present invention relates to computer cluster systems that can improve the availability with use of a plurality of computers respectively.

2. Description of Related Art (Patent Document 1)

JP-A No. 24069/2002

In recent years, computer systems are becoming indispensable social service infrastructures like power, gas, and water supplies. Such the computer systems, if they stop, will come to damage the society significantly. To avoid such the service stop, therefore, there have been proposed various methods. One of those methods is a cluster technique. The technique operates a plurality of computers as a group (referred to as a cluster). As a result, when a failure occurs in one of the computers, a standby computer takes over the task of the failed computer. And, no user knows the stop of the computer during the take-over operation. While the standby computer executes the task instead of the failed computer, the failed computer is replaced with a normal one to restart the task. Each computer of the cluster is referred to as a node and the process for taking over a task of a failed computer is referred to as a fail-over process.

To execute such a fail-over process, however, it is premised that the information in the failed computer (host processor) can be referred to from other host processors. The information mentioned here means the system configuration information (IP address, target disk information, and the like) and the log information of the failed host processor. The log information includes process records. The system configuration information that is indispensable for a standby host processor that takes over the task of a failed host processor as described above is static information whose updating frequency is very low. This is why each of the host processors in a cluster system will be able to retain the configuration information of other host processors without arising any problem. And, because the updating frequency is very low as described above, there is almost no need for a host processor to report the modification of its system configuration to other host processors, thereby the load of the communication processes among the host processors is kept small. The log information mentioned here refers to records of processes in each host processor. Usually, a computer process causes each related file to be modified. And, if a host processor fails in an operation, it becomes difficult to decide correctly how far the file modification is done. To avoid such a trouble, the process is recorded so that the standby host processor, when taking over a process through a fail-over process, restarts the process correctly according to the log information and assures that the file modification is done correctly. This technique is disclosed in JP-A No. 24069/2002 (hereinafter, to be described as the prior art 1). Generally speaking, the host processor stores the log information in magnetic disks. By the way, the inventor of prior art 1 does not mention the log storing method.

It is an indispensable process for cluster systems to store the log. However, the more the host processor stores the log in magnetic disks, the more its performance drops. Because latency of a magnetic disk is much longer than computation time of the host processor. In general, the latency of a magnetic disk equals to 10 milliseconds. On the other hand, the host processor calculates in time of the order of nanosecond or picosecond. The prior art 1 also discloses a method to avoid the problem by storing logs in a semiconductor memory referred to as a "log memory". A semiconductor memory can store each log at a lower overhead than magnetic disks.

According to the prior art 1, each host processor has its own log information in the "log memory". They do not share the "log memory". That is why a host processor sends a copy of its log information in its "log memory" to that of another host processor when the first one modifies its log information. According to the prior art 1, "mirror mechanism" takes charge of said replication of the log information. In the case of prior art 1, the number of host processors is limited only to two. So, the copy overhead is not so large. If the number of host processors increases, however, the copy overhead also increases. More specifically, when the number of host computers is n, the copy overhead is proportional to the square of n. And, if the performance of the host processors is improved, the log updating frequency (i.e. log copy frequency) also increases. Distribution of a log to other processors thus inhibits the performance improvement of the cluster system. In other words, the distribution of a log is a performance bottleneck of the cluster system.

Furthermore, in the prior art 1, the inventor does not mention that the "log memory" may be a non-volatile memory. Log information that is not stored in a non-volatile memory might be lost at a power failure. If the log information is lost, the system cannot complete a completed operation by means of the log information.

In order to solve the problem of the conventional technique as described above, storage for log information must satisfy the following three conditions:

(1) All host processors in the cluster system can share it.
(2) It must be non-volatile storage.
(3) Host processors can access it at low overhead.

The magnetic disk is one of such the non-volatile media to be shared by a plurality of host processors. However, its access overhead is large as described above.

Recently, some magnetic disk systems come to have a semiconductor memory referred to a disk cache. A disk cache can store data of the magnetic disk system temporarily and function as a non-volatile memory through a battery back-up process. In addition, in order to improve their reliability, some magnetic disk systems have a dual disk cache which stores the same data between those disk caches. The disk cache thus fulfills the above three necessary conditions (1) to (3). Thereby it is suited for storing logs. Concretely, a disk cache is low in overhead because it consists of semiconductor memory. It can be shared by a plurality of host processors because the disk cache is part of a magnetic disk. Furthermore, it comes to function as a non-volatile memory through a battery back-up process.

However, the disk cache is an area invisible from any software running in each host processor. This is because the software functions just as an interface that specifies the identifier of each magnetic disk, the addresses in the magnetic disk, and the data transfer length for the magnetic disk; it cannot specify any memory address in the disk cache. For example, in the case of the SCSI (Small Computer System Interface) standard (hereinafter, to be described as the prior art 2), which is a generic interface standard for magnetic disk systems, the host processors cannot access the disk cache freely while there are commands used by host processors to control the disk cache.

SUMMARY OF THE INVENTION

Under such circumstances, it is an object of the present invention to provide a method for enabling a disk cache to be recognized as an accessible memory while the disk cache has been accessed only together with its corresponding magnetic disk conventionally. To solve the above conventional problem, therefore, the disk system of the present invention is provided with an interface for mapping part of the disk cache in the virtual memory space of each host processor. And, due to the mapping of the disk cache in such the virtual memory space, the software running in each host processor is enabled to access the disk cache freely and a log stored in the low overhead non-volatile medium to be shared by a plurality of host processors.

It is another object of the present invention to provide a computer system that includes a plurality of host processors, a disk system, and a channel used for the connection between each of the host processors and the disk system. In the computer system, each host processor includes a main processor and a main memory while the disk system includes a plurality of disk drives, a disk cache for storing at least a copy of part of the data stored in each of the plurality of disk drives, a configuration information memory for storing at least part of the information used to denote the correspondence between the virtual address space of the main processor and the physical address space of the disk cache, and an internal network used for the connection among the disk cache, the main processor, and the configuration information memory. Although there is almost no significance to distinguish each host processor from the main processor, it is precisely defined here that one of the plurality of processors in the host processors, which is in charge of primary processes, is referred to as the main processor.

In a typical example, the configuration information memory that includes at least part of the information used to denote the correspondence between the virtual address space of the main processor and the physical address space of the disk cache stores a mapping table for denoting the correspondence between the virtual address space of the main processor and the physical address space of the disk cache. This table may be configured as a single table or by a plurality of tables that are related to each another. In an embodiment to be described later more in detail, the table is configured by a plurality of tables related to each another with use of identifiers referred to as memory handles. The plurality of tables that are related to each another may be dispersed physically, for example, at the host processor side and at the disk system side.

The configuration information memory may be a memory independent of the cache memory physically. For example, the configuration information memory and the cache memory may be mounted separately on the same board. The configuration information memory may also be configured as a single memory in which the area is divided into a cache memory and a configuration memory. The configuration information memory may also store information other than configuration information.

For example, a host processor includes a first address translation table used to denote the correspondence between the virtual address space of the main processor and the physical address space of the main memory while the disk system includes a second address translation table used to denote the correspondence between the virtual address space of the main processor and the physical address space of the disk cache and an exported segments control table used to denote the correspondence between the physical address space of the disk cache and the IDs of the host processors that use the physical address space of the disk cache. The exported segments control table is stored in the configuration information memory.

Each of the second address translation table and the exported segments control table has an identifier (memory handle) of the physical address space of the mapped disk cache, so that one of their identifiers is referred to identify the correspondence between the host processor ID and the physical address space of the disk cache, used by the host processor.

The computer system of the present invention, configured as described above, will thus able to use a disk cache memory area as a host processor memory area. What should be noticed here in the computer system is the interconnection between the disk cache and the main processor through a network or the like. This makes it possible to share the disk cache among a plurality of main processors (host processors). This is why the configuration of the computer system is suited for storing data that is to be taken over among a plurality of main processors. Typically, the physical address space of the disk cache used by a host processor stores the log of the host processor. What is important here as such the log information is, for example, work records (results) of each host processor, which are not stored yet in any disk. If a failure occurs in a host processor, another (standby) host processor takes over the task (fail over). In the case of the present invention, such the standby host processor that has taken over a task also takes over the log information of the failed host processor to complete the subject task and records the work result in a disk.

The configuration information memory can also be shared by a plurality of host processors just like the disk cache if it is accessed from those host processors logically and connected, for example, to a network connected to the main processor.

The information (ex., log information) recorded in the disk cache and accessed from host processors may be a copy of the information stored in the main memory of each host processor or original information stored only in the disk cache. When the information is log information, which is accessed in ordinary processes, the information should be stored in the main memory of each host processor so that it is accessed quickly. A method that enables a log to be left in the main memory and a log copy to be stored in the disk cache to prepare for a fail-over process will thus be able to assure high system performance. If an overhead required to form such a log copy is to be avoided, however, the log information may be stored only in the disk cache; storing of the log information in the main memory may be omitted here.

It is still another object of the present invention to provide a special memory other than the disk cache. The memory is connected to an internal network that is already connected to the disk cache, the main processor, and the configuration information memory, and used to store log information. This configuration of the memory also makes it easier to share log information among a plurality of host processors as described above. And, because the disk cache is usually a highly reliable memory to be backed up by a battery or the like, it is suited for storing log information that must be reliable. In addition, the disk cache has some advantages that there is no need to add any special memory or make significant modification for the system itself, such as modification of the controlling method. Consequently, using such the disk cache will be more reasonable than providing the system with such a special memory as a log information memory.

The present invention may also apply to a single disk system. In this connection, the disk system is connected to one or more host processors. More concretely, the disk system includes a plurality of disk drives, at least one disk cache for recording a copy of at least part of the data stored in those disk drives, and a control block for controlling the correspondence between the memory address space in the disk cache and the virtual address space in each host processor. Part of the disk cache can be accessed as part of the virtual address space of each host processor.

In a concrete embodiment, the disk system includes a disk cache control table to denote the correspondence between the data in each disk drive and the data stored in the disk cache, a free segments control table for controlling free segments in the disk cache, and an exported segments control table for controlling areas in the disk cache, which correspond to part of the virtual address space of each host processor.

It is still another object of the present invention to provide a disk cache controlling method employed for computer systems, each of which comprises a plurality of host processors, a plurality of disk drives, a disk cache for storing a copy of at least part of the data stored in each of the disk drives, and a connection path connected to the plurality of host processors, the plurality of disk drives, and the disk cache. The method includes a step of denoting the correspondence between the physical addresses in the disk cache and the virtual addresses in each host processor and a step of accessing part of the disk cache as part of the virtual address space of each host processor.

The step of denoting the correspondence between the physical addresses in the disk cache and the virtual addresses in each host processor includes the following steps of:

(a) sending a virtual address and a size of a disk cache area requested from a host processor together with the ID of the host processor to request a disk cache area;

(b) referring to a first table for controlling free areas in the disk cache to search a free area therein;

(c) setting a unique identifier to the requested free area when a free area is found in the disk cache;

(d) registering both memory address and identifier of the free area in a second table for controlling areas corresponding to part of the virtual address space of each of the host processors;

(e) deleting the information related to the registered area from the first table for controlling free areas of the disk cache;

(f) registering a memory address of the area in the disk cache and its corresponding virtual address in a third table used to denote the correspondence between the virtual address space of each of the host processors and the disk cache;

(g) reporting successful allocation of the disk cache area in the virtual address space of the host processor to the host processor; and (h) Sending an identifier of the registered area to the host processor.

In order to achieve the above objects of the present invention more effectively, the following commands are usable.

(1) An atomic access command for enabling each host processor to access a disk cache area mapped in its virtual address space; the command reads the data from the target area, and then updates the data while the command disables other host processors to access the area.

(2) An atomic access command for enabling each host processor to access a disk cache area mapped in its virtual address space; the command reads data from the target area to compare the data with a given expectation value, then updates the data if it matches with the expectation value while the command disables other host processors to access the area during this series of operations.

(3) An atomic access command for enabling each host processor to access a disk cache area mapped in its virtual address space; the command reads data from the target area to compare the data with an expectation value, then updates the data if the data does not match with the expectation value while the command disables other host processors to access the area during this series of operations.

In order to achieve the above objects of the present invention more effectively, a terminal provided with the following functions is usable.

(1) The disk system includes a control terminal to be operated by the user to set a capacity of the disk cache corresponding to the virtual address space of a subject host processor.

(2) Furthermore, the user uses the control terminal to set a capacity of the virtual address space of each host processor when the capacity enables part of the disk cache to correspond to the virtual address space of the host processor.

BRIEF DESCRIPTION OF THE DRAWINGS

FIG. 3 is an address translation table 206;

FIG. 8 is a disk cache control table 126;

FIG. 9 is a free segments control table 127;

FIG. 10 is an exported segments control table 128;

FIG. 11 is an address translation table 411;

DETAILED DESCRIPTION OF THE PREFERRED EMBODIMENTS

Hereunder, the preferred embodiments of the present invention will be described with reference to the accompanying drawings.

<First Embodiment>

Figure 1:
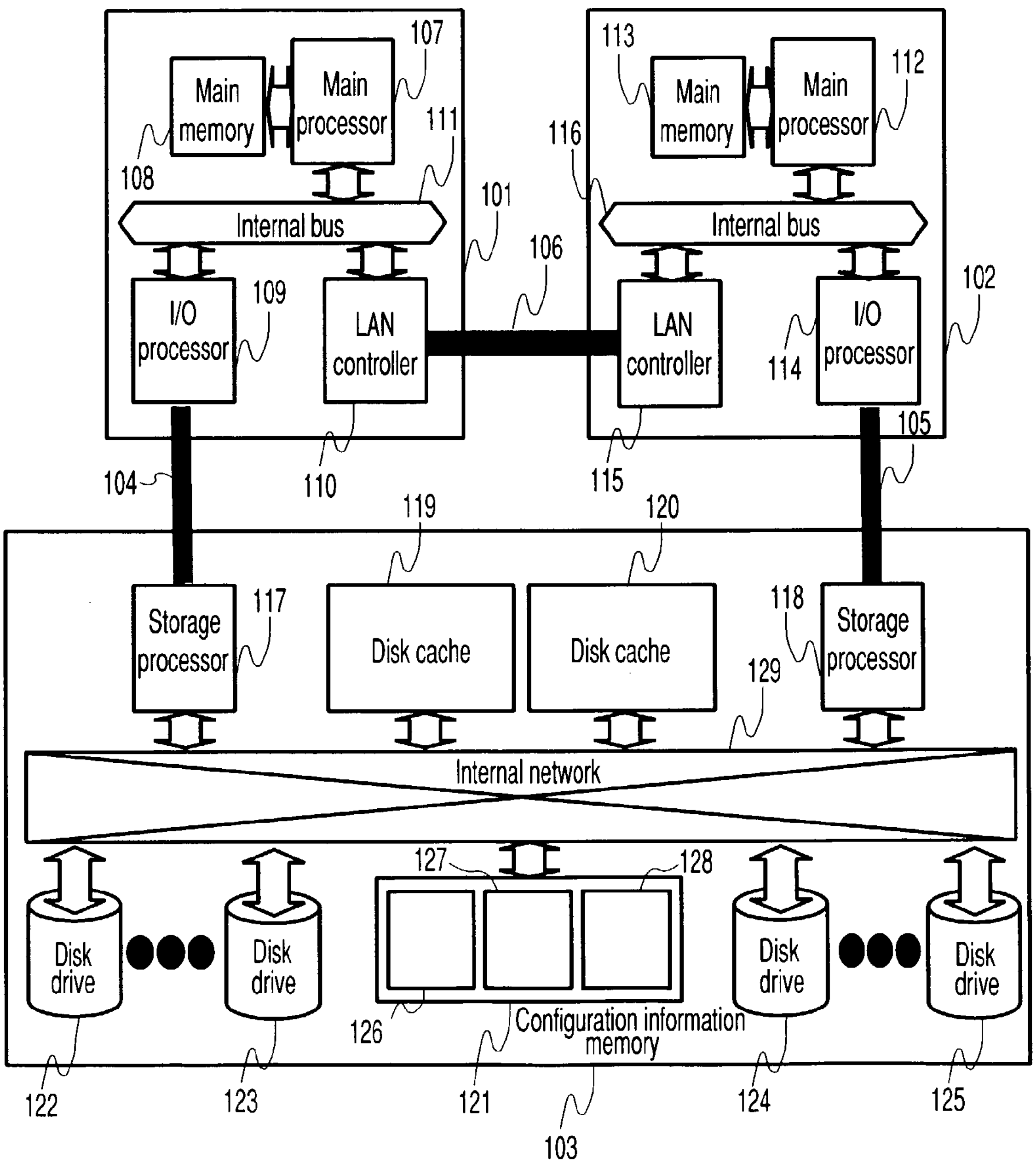
FIG. 1 is a block diagram of a computer system of the present invention.

FIG. 1 shows a block diagram of a computer system of the present invention. This system is referred to, for example, as a network attached storage (NAS) or the like. This computer system is configured mainly by two host processors 101 and 102, as well as a disk system 103. Two I/O channels 104 and 105 are used to connect the host processors 101 and 102 to the disk system 103 respectively. A LAN (Local Area Network) 106 such as the Ethernet (trade mark) is used for the connection between the two host processors 101 and 102.

The host processor 101 is configured by a main processor 107, a main memory 108, an I/O processor 109, and a LAN controller 110 that are connected to each another through an internal bus 111. The I/O processor 109 transfers data between the main memory 108 and the I/O channel 104 under the control of the main processor 107. The main processor 107 in this embodiment includes a so-called microprocessor and a host bridge.

Because it is not important to distinguish the microprocessor from the host bridge to describe this embodiment, the combination of the microprocessor and the host bridge will be referred to as a main processor 107 here. The configuration of the host processor 102 is similar to that of the host processor 101; it is configured by a main processor 112, a main memory 113, an I/O processor 114, and a LAN controller 115 that are connected to each another through an internal bus 116.

At first, the configuration of the disk system 103 will be described. The disk system 103 is configured by storage processors 117 and 118, disk caches 119 and 120, a configuration information memory 121, and disk drives 122 to 125 that are all connected to each another through an internal network 129. Each of the storage processors 117 and 118 controls the data input/output to/from the disk system 103. Each of the disk caches 119 and 120 stores data read/written from/in any of the disk drives 122 to 125 temporarily. In order to improve the reliability, the disk system stores the same data in both disk caches 119 and 120. In addition, a battery (not shown) can supply a power to those disk caches 119 and 120 so that data is not erased even at a power failure, which is most expected to occur among the device failures. The configuration information memory 121 stores the configuration information (not shown) of the disk system 103. The configuration information memory 121 also stores information used to control the data stored in the disk caches 119 and 120. Because the system is provided with two storage processors 117 and 118, the memory 121 is connected directly to the internal network 129 so that is it accessed from both of the storage processors 117 and 118. The memory 121 might also be duplicated (not shown) and receive a power from a battery so as to protect the configuration information that, when it is lost, might cause other data to be lost. The memory 121 stores a disk cache control table 126 for controlling the correspondence between the data stored in the disk caches 119 and 120 and the disk drives 122 to 125, a free segments control table 127 for controlling free disk cache areas, and an exported segments control table 128 for controlling the areas mapped in the host processors 101 and 102 in the disk caches 119 and 120.

Figure 2:
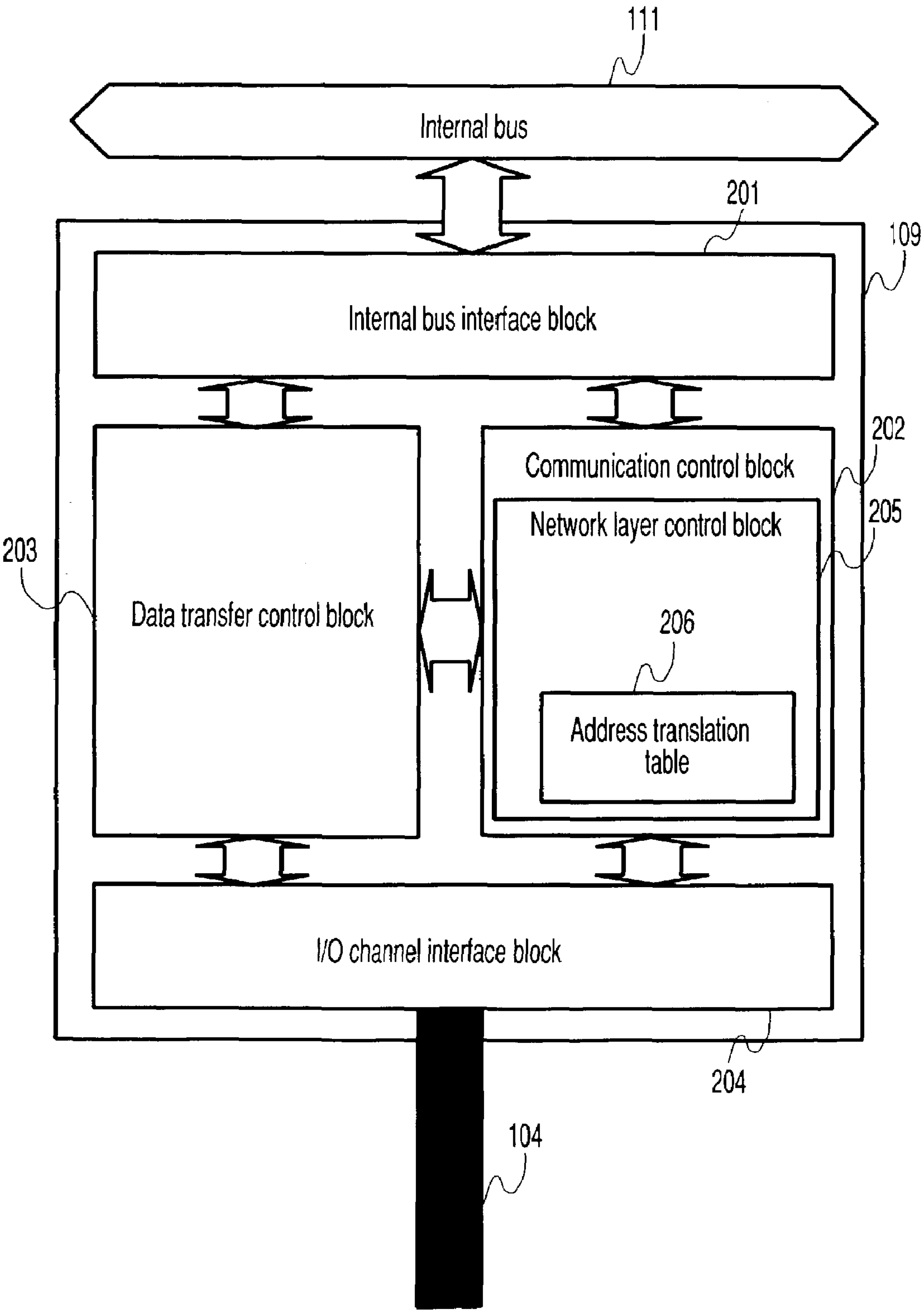
FIG. 2 is a block diagram of an I/O processor 109.

Next, a description will be made for the I/O processor 109 with reference to FIG. 2. The I/O processor 109 is configured by an internal bus interface block 201 connected to the internal bus, a communication control block 202 for controlling the communication of the I/O channel 104, a data transfer control block 203 for controlling the data transfer between the main memory 108 and the I/O channel 104, an I/O channel interface block 204 with the I/O channel 104. The communication control block 202 is configured by a network layer control block 205. In this embodiment, it is premised that the I/O channel interfaces 104 and 105 use a kind of network. Concretely, the I/O channel interfaces 104 and 105 employ an I/O protocol as an upper layer protocol while they use such an I/O protocol as the SCSI standard one for the data input/output to/from the disk system 103. The network layer control block 205 controls the network layer of the I/O channel 104. The address translation table 206 denotes the correspondence between physical addresses of some areas of the disk caches 119 and 120 and the virtual addresses of the host processor 101. In this embodiment, the I/O processor 109 described above is similar to the I/O processor 114. Although the communication control block 202 is realized by a software program and others are realized by hardware items in this embodiment, the configurations may be varied as needed. And, although the address translation table 206 is built in the internal bus interface block 201 in this embodiment, it may be placed in any other place if it is accessed through a bus or network.

FIG. 3 shows the address translation table 206. The virtual address 301 is an address in the memory area located in a peripheral device (the disk system 103 here)). The physical address 302 denotes a hardware address corresponding to the virtual address 301. In this embodiment, the physical address 302 denotes a physical address in the main memory 108. The memory size 303 is a size of an area controlled in this translation table. An area beginning at the physical address 302 to extend by the size 303 is mapped in a virtual address space. The memory handle 304 is a unique identifier of the virtual memory area controlled by this translation table 206. If the main processor 107 writes data in an area specified by the physical address 302 and issues a write command to the I/O processor 109 to write data in the virtual address 301, the I/O processor 109 transfers the data to a memory area corresponding to the target peripheral device (the disk system 103 here). On the contrary, if the main processor 107 issues a read command to the I/O processor 109 so as to read data from the virtual address 301, data transferred from the peripheral device is stored in the physical address 302.

Figure 4:
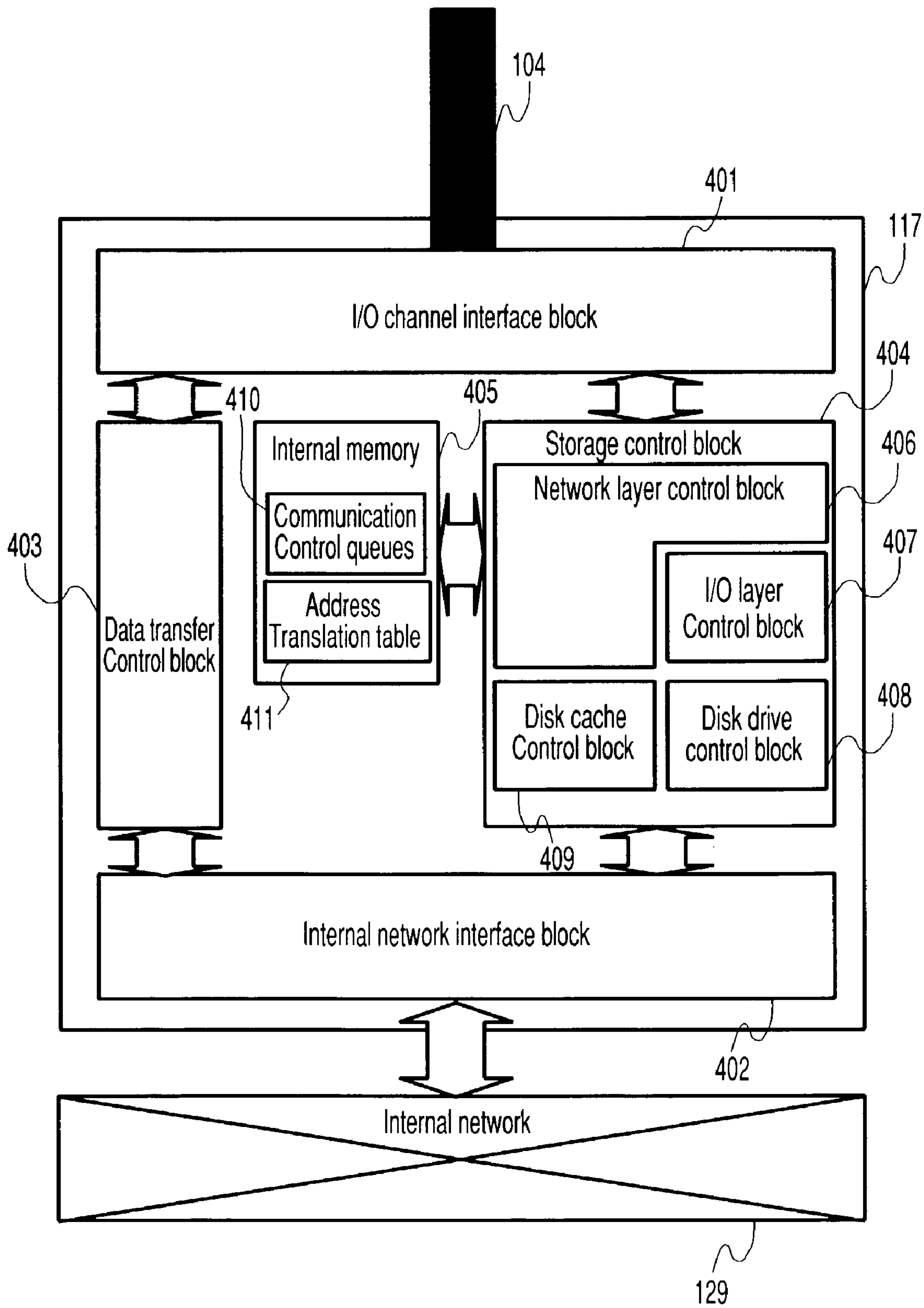
FIG. 4 is a block diagram of a storage processor 117.

Next, the configuration of the storage processor 117 will be described with reference to FIG. 4. The storage processor 117 controls the disk system 103. The storage processor 117 is configured by an I/O channel interface block 401 for communicating with the I/O channel 104, an internal network interface block 402 for communicating with the internal network 129, a data transfer control block 403 for controlling data transfer, a storage control block 404 for controlling the disk system 103, and an internal memory 405 for storing information used by the storage control block 404 for controlling. The storage control block 404 is configured by a network layer control block 406 for controlling the network layer in the communication through the I/O channel, an I/O layer control block 407 for controlling the I/O layer, a disk drive control block 408 for controlling the disk drives 122 to 125 according to the I/O commands from the host processor 101, and a disk cache control block 409 for controlling the data stored in the disk caches 119 and 120 and makes cache hit/miss judgment or the like. The internal memory 405 stores communication control queues 410 and the address translation table 411. The communication control queues 410 are queues used for the communication through the I/O channel in this embodiment. A transmit queue and a receive queue are paired as a queue pair and a plurality of such queue pairs can be generated to form the communication control queues 410. The details will be described later. The present invention is not limited only to this communication method, of course. The storage processor 117 described above is similar to the storage processor 118.

Figure 5:
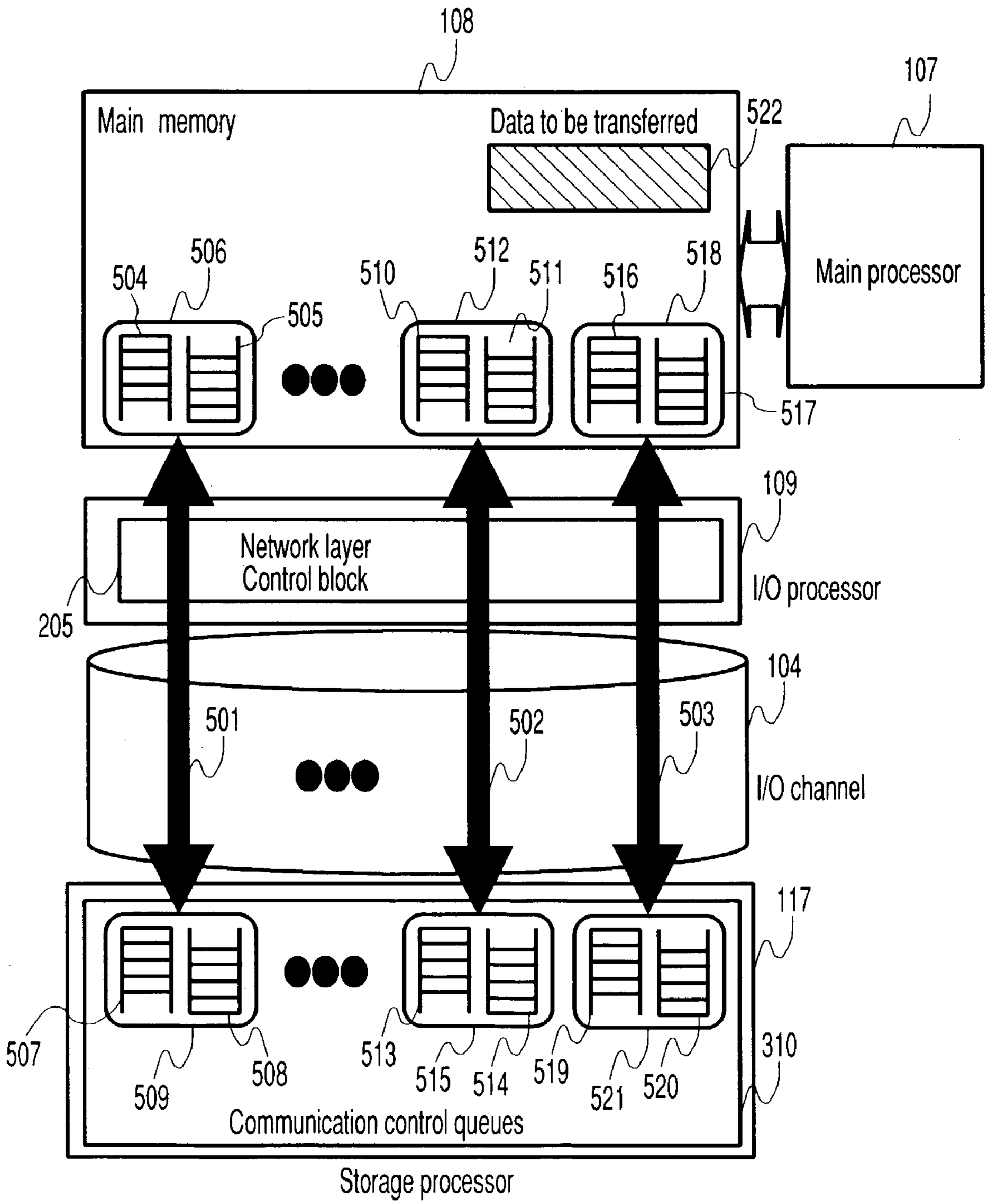
FIG. 5 is a concept chart for describing a communication method employed for I/O channels 104 and 105.

Next, the communication queues 410 will be described with reference to FIG. 5. In this embodiment, the I/O channel begins the communication after two subject devices (the host processor 101 and the storage processor 117 here) establish a virtual communication channel (hereinafter, to be described just as connections) 501 to 503. Here, how the connection 501 is established will be described. At first, the main processor 107 generates a queue pair 504 consisting of a transmit queue 510 and a receive queue 511 in the main memory 108. The transmit queue 510 stores commands used by the main processor 107 to send/receive data to/from the I/O processor 109. The I/O processor 109takes out commands from the transmit queue 510 sequentially to send them. The transmit command may store a pointer for the data 522 to be transferred. The receive queue 511 stores commands and data received from external. The I/O processor 109 stores received commands and data in the receive queue 511 sequentially. The main processor 107 takes out commands and data from the receive queue 511 sequentially to receive them. When the queue pair 506 is generated, the main processor 107 issues a connection establishment request to the I/O processor 109. Then, the network layer control block 205 issues a connection establishment request to the storage processor 117. Receiving the request, the network layer control block 406 of the storage processor 117 generates a queue pair 509 consisting of a transmit queue 507 and a receive queue 508 and reports the completion of the connection establishment to the I/O processor 109. Other connections 501 to 503 are also established similarly.

The communication method of the I/O channel in this embodiment is employed on the presumption that information is sent/received in frames in a communication path. The sender describes a queue pair identifier (not shown) in each frame to be sent to the target I/O channel 104/105. The receiver then refers to the queue pair identifier in the frame and stores the frame in the specified receive queue. This method is generally employed for each of such protocols as the InfiniBand™, etc. In this embodiment, a dedicated connection is established for the transfer of each I/O command and data with respect to the disk system 103. Communications other than the input/output to/from the disk system 103 are made through another established connection (that is, another queue pair).

In the communication method of the I/O channel in this embodiment, each of the storage processors 117 and 118 operates as follows in response to an I/O command issued to the disk system 103. The network layer control block 406, when receiving a frame, analyzes the frame, refers to the queue pair identifier (not shown), and stores the frame in the specified receive queue. The I/O layer control block 407 monitors the receive queue used for I/O processes. If the I/O command is found in the queue, the I/O layer control block 407 begins the IP process. On the other hand, the disk cache control block 409 controls the corresponding disk cache 119/120 as needed in the data input/output process while the disk drive control block 408 accesses the target one of the disk drives 122 to 125. If the I/O command is found in another receive queue, the network layer control block 406 continues the process. At this time, the network layer control block 406 does not access any of the disk drives 122 to 125.

Next, how to control the disk cache 119/120 will be described with reference to FIGS. 6 through 10.

Figure 6:
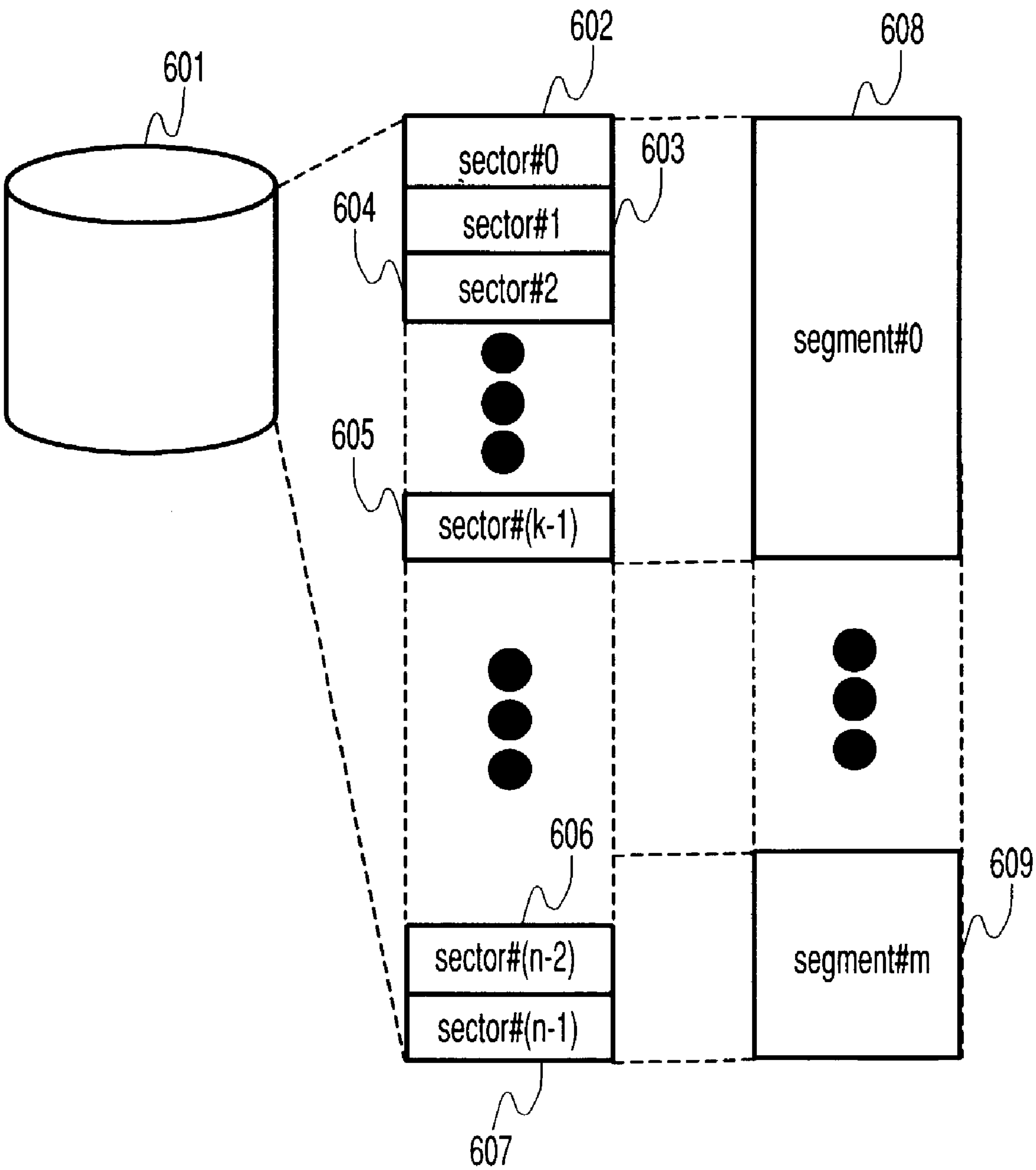
FIG. 6 is a concept chart for describing an area control method of a logical disk 601.

FIG. 6 shows a method for controlling the disk space of a logical disk 601. The logical disk 601 mentioned here is a virtual disk emulated by the disk system 103 for the host processors 101 and 102. The logical disk 601 may be or not may be any of the disk drives 122 to 125. If the disk system 103 uses the RAID (Redundant Array Inexpensive Disks) technique, the logical disk 601 comes to be emulated naturally. In this embodiment, it is premised that respective logical disks are equal to the disk drives 122 to 125. The logical disk 601 emulated such way consists of n sectors. A sector is a continuous area fixed in size and it is the minimum unit for accessing the logical disk 601. In the case of the SCSI standard, the sector size is 512 bytes. Each of the host processors 101 and 102 handles the logical disk 601 as a one-dimensional array of these sectors. This means that the logical disk 601 can be accessed by specifying a sector number and a data length. In the SCSI standard, a sector number is also referred to as a logical block address. In this embodiment, a collection (unit) of a plurality of sectors is referred to as a segment. In FIG. 6, sectors #0 602 to #(k-1) 605 are collected and controlled as a segment #0 608. Data is transferred to the disk caches 119 and 120 in segments. This is because it is not effective to transfer data sector by sector, since the sector size is as small as 512 bytes. And, because of the data locality, if data is inputted/outputted in segments, the possibility that the next access becomes a cache hit becomes higher. This is why the controlling unit (minimum access unit) of the disk caches 119 and 120 in this embodiment is defined as a segment. It is premised that the segment size is 64 KB in this embodiment.

Figure 7:
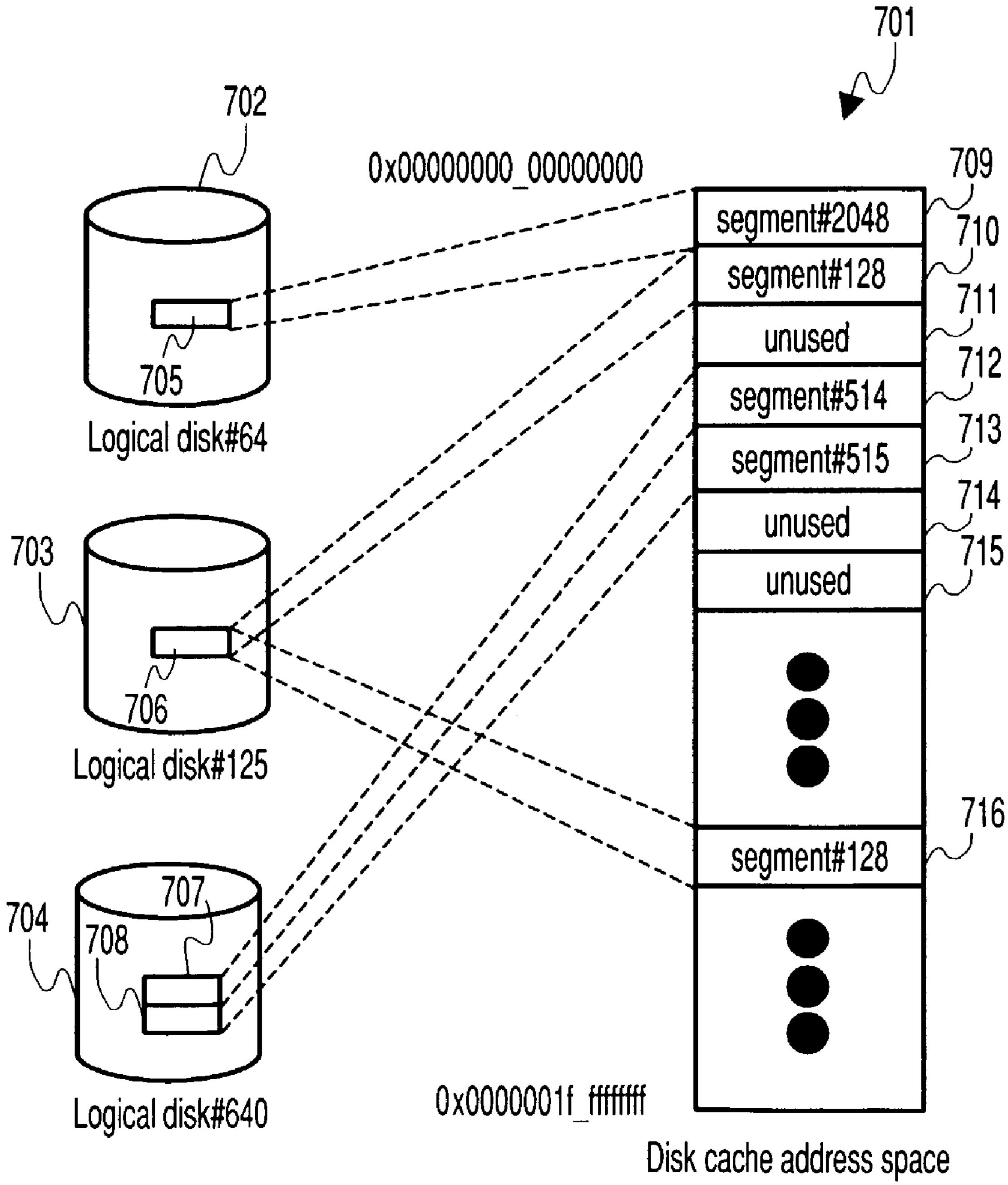
FIG. 7 is a concept chart for describing the correspondence of data between a disk cache address space 701 and each of logical disks 702 to 704.

FIG. 7 shows how logical disk segments are mapped into the address space of the disk cache 119/120. The disk cache address space 701 is handled as a one-dimensional array of segments. In FIG. 7, the total memory space of the disk caches 119 and 120 is 128 GB and it is addressed as a single memory space. In the disk cache 119, addresses 0x00000000_00000000 to 0x0000000f_fffffff are allocated. In the disk cache 120, addresses 0x00000010_00000000 to 0x0000001f_fffffff are allocated. The segments #2048 708 of the logical disk #64 702 is disposed in the area 709 in the disk cache 119/120. The segment #128 706 of the logical disk #125 703 is disposed in the areas 710 and 716 in the disk caches 119 and 120. This means that data to be written by the host processor 101/102 in the disk system 103 and to be stored in the disk caches 119 and 120 temporarily is written doubly to improve the reliability. The segments #514 707 and #515 708 of the logical disk #640 are disposed in the areas 712 and 713 respectively. This means that the data size requested by the host processor 101/102 is large, so that the requested data is stored in the two segments #514 and #515. The logical disk data is disposed in the disk cache space 701 as described above.

FIG. 8 shows the disk cache control table 126. The table 126 is stored in the configuration information memory 121. The table 126 denotes how each area of the disk cache 119/120 is allocated for each segment of the logical disk. The disk number column 801 describes the number of each logical disk that stores the target data. The segment number column 802 describes the number of each segment in the logical disk with respect to the data stored therein. The table 126 has two disk cache address columns 803. This is because the addresses are duplicated in the two disk caches 119 and 120. The left column is used for the addresses in the disk cache 119 and the right column is used for the addresses in the disk cache 120. The cache status column 804 describes the status of each segment; "free", "clean", and "dirty". The "free" means that the segment is free (empty). The "clean" means that the data stored in both disk matches with the data stored in the disk caches 119 and 120 while the segment is mapped in the disk caches 119 and 120. The "dirty" means that data stored in the disk caches 119 and 120 does not match with the data stored in the corresponding logical disk. The disk system 103, when completing storing of data written by a host processor 101/102 therein, reports the end of the writing to the disk caches 119 and 120. At this time, the data stored in the disk caches 119 and 120 does not match with the data stored in the disk system 103 yet. If a failure occurs in the disk cache 119/120 at this time, however, the data might be lost. To avoid this trouble, therefore, the writing in the disk system 103 is ended quickly. The row 805 describes that the data in the segment #2048 of the disk #64 is stored in the address 0x00000000_00000000 in the disk cache 119. And, the status is "clean". No data is lost even at a failure in the disk cache 119, so no data exists in the disk cache 120. The row 806 describes that the segment #128 of the disk #125 exists in the addresses 0x00000000_00010000 and 0x00000008_00010000 in the disk caches 119 and 120, thereby the segment #128 is "dirty" in status. This means that the data in the disk is not updated yet by the data written in duplicate by the host processor 101/102 as described above so as to prepare for a failure to occur in the disk cache 119/120. The rows 807 and 808 describe that the segments #514 and #515 of the disk #640 exist in the disk cache 119. This is because those segments are "clean" in status, so that they exist only in the disk cache 119.

FIG. 9 shows the free segment control table 127 for controlling disk cache segments in the free status. This table 127 is also stored in the configuration information memory 121. The table 127 describes free disk cache segment addresses. This table 127 is referred to upon disk cache allocation so as to register usable segments in the disk cache control table 126. After this, each piece of usable segment information is deleted from the table 127. The number column 901 describes the number of each entry registered in the table 127. The free disk cache segment address 902 describes a disk cache address set for each free segment.

The storage processor 117/118 operates as follows in response to a read command issued from a host processor 101/102. The storage processor 117/118 refers to the disk cache control table 126 to decide if the segment that includes the data requested by the host processor 101/102 exists in the disk cache disk cache 119/120. If the segment is registered in the disk cache control table 126, the segment exists in the disk cache 119/120. The storage processor 117/118 then transfers the data to the host processor 101/102 through the disk cache 119/120. If the requested data is not registered in the disk cache control table 126, the segment does not exist in the disk cache 119/120. The storage processor 117/118 thus refers to the free segments control table 127 and registers a free segment in the disk cache control table 126. After this, the storage processor 117/118 instructs the target one of the disk drives 122 to 125 to transfer the segment to the disk cache 119/120. When the segment transfer to the disk cache 119/120 ends, the storage processor 117/118 transfers the data to the host processor 101/102 through the disk cache 119/120.

The storage processor 117/118, when receiving a write command from the host processor 101/102, operates as follows. The storage processor 117/118 refers to the free segments control table 127 to register free segments of both of the disk caches 119 and 120 in the disk cache control table 126. The storage processor 117/118 then receives data from the host processor 101/102 and writes the data in the segments. At this time, the data is written in both of the disk caches 119 and 120. When the writing ends, the storage processor 117/118 reports the completion of the writing to the host processor 101/102. The storage processor 117/118 then transfers the data to the target one of the disk drives 122 to 125 through the disk caches 119 and 120.

FIG. 10 shows the exported segments control table 128 of the present invention. The exported segments control table 128 maps part of the disk cache 119/120 in the virtual address space of the host processor 101/102. This exported segments control table 128 is also stored in the configuration information memory 121. The storage processor 117/118, when allocating a segment of a disk cache 119/120, registers the segment in the exported segments control table 128. And accordingly, the segment entry is deleted from the free segments control table 127 at this time. The memory handle column 1001 describes the identifier of each mapped memory area. When the storage processor 117/118 maps an area of the disk cache 119/120 into the virtual address space of the host processor 101/102, the storage processor 117/118 generates a memory handle and sends it to the host processor 101/102. The memory handle 1001 is unique in the disk system 103. The host processor 101/102 uses this memory handle so that the handle is shared by the host processors 101 and 102. The host ID column 1002 describes the identifier of the host processor 101/102 that has requested the segment. This identifier may be the IP address, MAC address, WWN (World Wide Name), or the like of the host processor 101/102. The identifier may also be negotiated between the host processors so that it becomes unique between them. This embodiment employs such the method for assigning a unique identifier to each host processor through negotiation between the host processors. The disk cache address column 1003 describes each segment address in each disk cache mapped into the virtual address space of the host processor 101/102. This mapped segment is not written in any of the disk drives 122 to 125, so that it is always duplicated. This is why the segment has two columns of entries in the table 128. The left column denotes the segment addresses of the disk cache 120. The share mode bit 1004 decides whether or not the segment is shared by the host processors 101 and 102. In FIG. 10, the share mode bit 1004 is 16 bits in length. If bit 15 denotes 1, the host processor having the host ID 15 is enabled to read/write data from/in the area. The allocation size 1005 denotes how far the subject area beginning at the mapped first segment is used. This is needed, since a memory area required by the host processor 101/102 is not always equal to the segment size. The row 1006 describes that the host processor with its host ID 0x04 has allocated a 64 KB disk cache area in its virtual memory space. And, because the share mode bit denotes 0xffff, every host processor can refer to and update the area. The row 1007 describes that the host processor with its host ID 0x08 has mapped a 32 KB disk cache area in its virtual memory space. And, because the share mode bit denotes 0x0000, the area cannot be referred to nor updated by any other host processor. In this connection, all the allocated segments are not used. The rows 1008 and 1009 describe that the host processor with its host ID 0x0c has mapped a 72 KB area of the disk cache 119/120 in its virtual memory space. Because the segment size is 64 KB, the storage processors 117 and 118 allocate two disk cache segments. The host processor requests only a 72 KB disk cache area, so that only 32 KB is used in the row 1010.

FIG. 11 shows the address translation table 411 stored in the internal memory 405 located in the storage processor 117. The virtual address column 1101 describes addresses in the virtual memory of each host processor. The physical address column 1102 describes their corresponding memory addresses. In this case, because the disk cache 119/120 is mapped, a physical address 1102 describes a disk cache segment address. And, the disk cache is duplicated as 119 and 120 disposed in two lines. The disk cache 119 is disposed at the left side and the disk cache 120 is disposed at the right side. An allocation size 1103 describes the number of actually used segments beginning at the first one just like that shown in FIG. 10. The memory handle column 1104 describes the same information as that shown in FIG. 10. The exported segments control table 128 and the address translation table 411 store the same information, so that they may be integrated into one.

In this example, the address translation table 411 is stored in the storage processor while the disk cache control table 126, the free segments control table 127, and the exported segments control table 128 are stored in the configuration information memory. However, if they can be accessed from the main processor through a bus or network, they may be stored in any other place in the system, such as in a host processor. On the other hand, the address translation table 411 should preferably be provided so as to correspond to its host processor. And, the disk cache control table 126, the free segments control table 127, and the exported segments control table 128 should preferably be stored as shown in FIG. 1, since they are accessed from every host processor in that system configuration.

Figure 12:
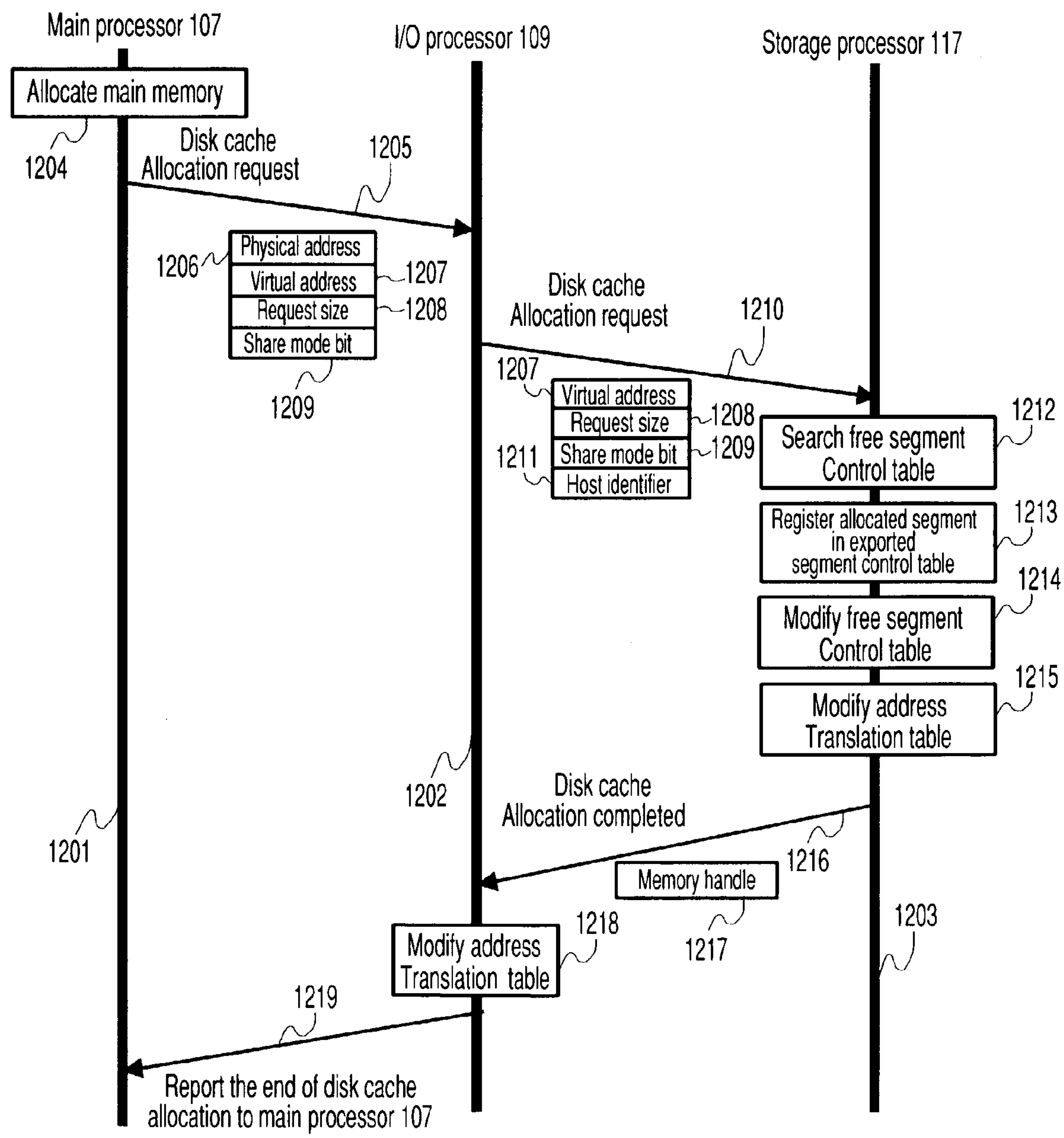
FIG. 12 is a ladder chart for a disk cache area allocation process (successful)

FIG. 12 shows a ladder chart for describing how a disk cache 119/120 area is allocated. The processes shown in this ladder chart are performed after a connection is established. In this case, it is premised that a disk cache is already allocated successfully. Concretely, the processes will be performed as follows. In step 1204, the main processor 107 allocates a memory area to be mapped in the target disk cache 119/120 in the main memory 108.

In step 1205, the main processor 107 issues a disk cache allocation request to the I/O processor 109. Concretely, the main processor 107 sends the physical address 1206, the virtual address 1207, the request size 1208, and the share mode bit 1209 to the I/O processor 109 at this time.

In step 1210, the I/O processor 109 transfers the disk cache allocation request to the storage processor 117. At this time, the I/O processor 109 transfers virtual address 1207, the request size 1208, the share mode bit 1209, and the host ID 1211 to the storage processor 117.

In step 1212, the storage processor 117, receiving the request, refers to the free segments control table 127 to search a free segment therein.

In step 1213, the storage processor 117, if any free segment is found therein, registers the segment in the exported segments control table 128. Then, the storage processor 117 generates a memory handle and sets it in the exported segments control table 128, as well as the share mode bit 1209 and the host ID 1211 in the exported segments control table 128.

In step 1214, the storage processor 117 deletes the registered segment from the free segments control table 127.

In step 1215, the storage processor 117 registers the received virtual address 1207 and the allocated segment address of the disk cache in the address translation table 411.

In step 1216, the storage processor 117 reports the completion of the disk cache allocation to the I/O processor 109 together with the generated memory handle 1217.

In step 1218, the I/O processor 109 describes the physical address 1206, the virtual address 1207, the request size 1208, and the memory handle in the address translation table 411.

In step 1219, the I/O processor 109 reports the completion of the disk cache allocation to the main processor 107.

Figure 13:
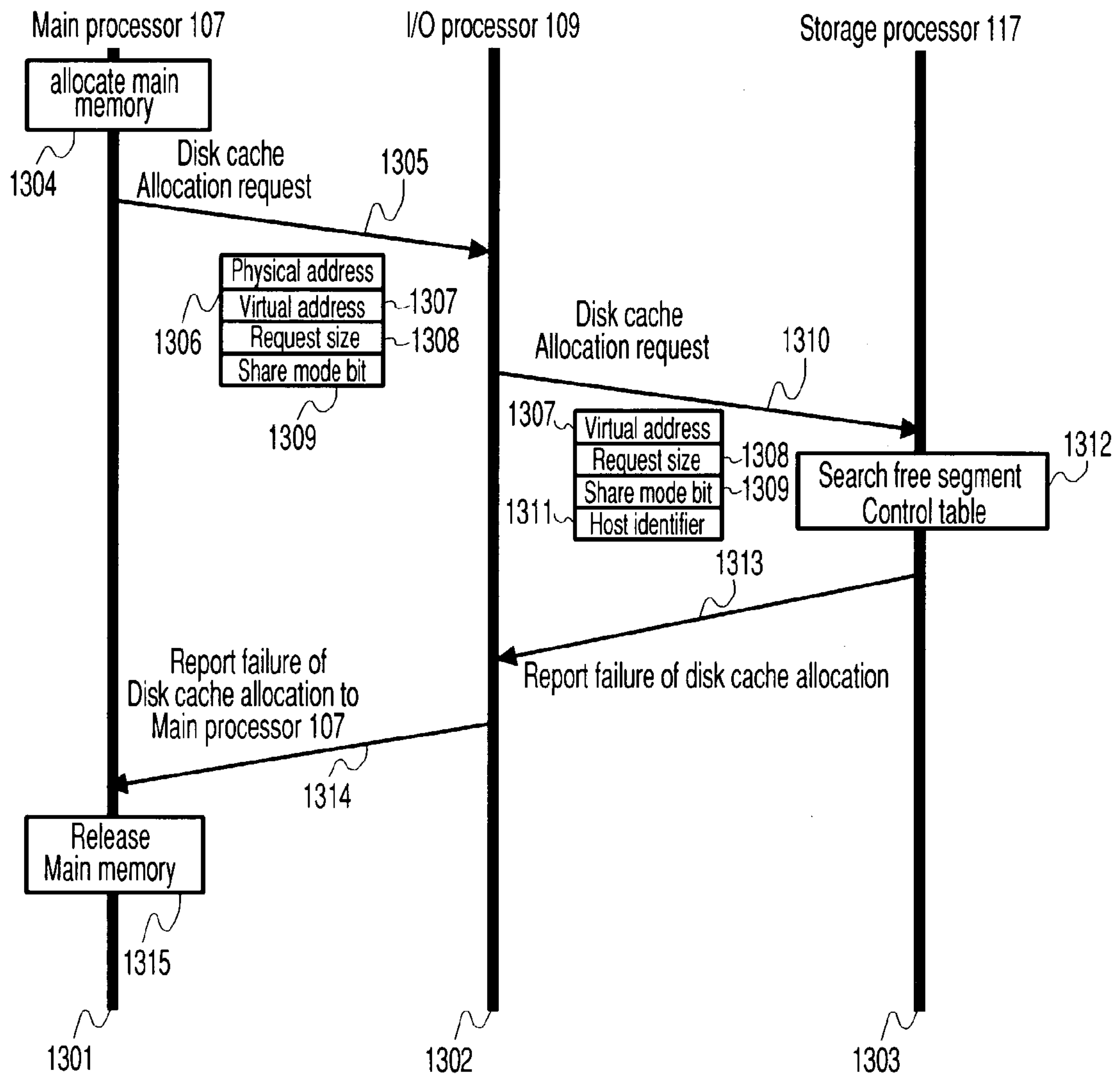
FIG. 13 is a ladder chart for a disk cache area allocation process (failure)

FIG. 13 shows a ladder chart for describing the processes to be performed after a failure of disk cache allocation. Just like FIG. 12, FIG. 13 shows a case in which a connection is already established.

In step 1304, the main processor 107 allocates a memory area to be mapped in the target disk cache 119/120 in the main memory 108.

In step 1305, the main processor 107 issues a disk cache allocation request to the I/O processor 109. Concretely, the main processor 107 sends the physical address 1306, the virtual address 1307, the request size 1308, and the share mode bit 1309 to the I/O processor 109 at this time.

In step 1310, the I/O processor 109 transfers the disk cache allocation request to the storage processor 117. At this time, the I/O processor 109 transfers the virtual address 1307, the request size 1308, the share mode bit 1309, and the host ID 1311 to the storage processor 117.

In step 1312, the storage processor 117, receiving the request, refers to the free segments control table 127 to search a free segment therein.

In step 1313, the storage processor 117, if any free segment is not found therein, reports the failure of the disk cache allocation to the I/O processor 109.

In step 1314, the I/O processor 109 reports the failure of the disk cache allocation to the main processor 107.

In step 1315, the area of the main memory allocated in step 1304 is thus released.

In the examples shown in FIGS. 12 and 13, it is assumed that a predetermined main memory area and a predetermined disk cache area are paired; for example, a copy of a main memory area is stored in a cache memory area. However, it is also possible to allocate a predetermined area in a disk cache memory regardless of the main memory area. In this connection, it is just required to omit the main memory allocation in steps 1204 and 1304, as well as the memory release in step 1315.

Figure 14:
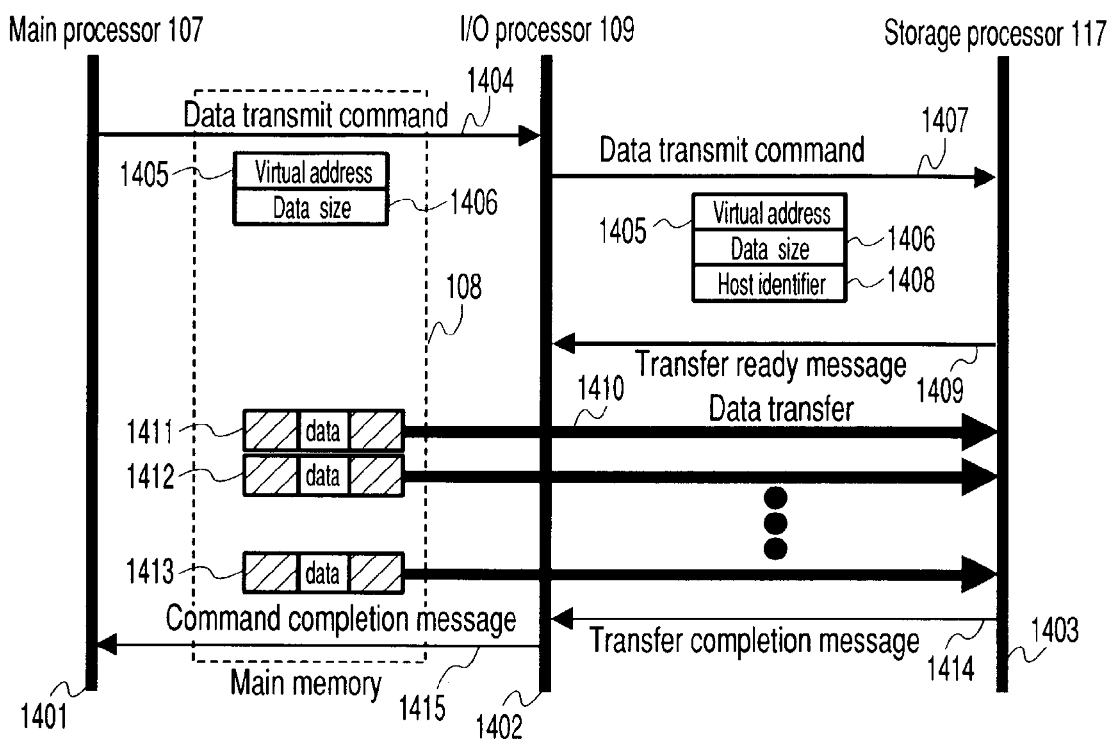
FIG. 14 is a ladder chart for data transfer between a host processor and a disk cache.

As shown in the ladder chart in FIG. 14, when the mapping between the main memory 108 and the disk cache 119/120 is completed, the data is transferred from the main memory 108 to the disk caches 119 and 120. A portion 1405 enclosed by a dotted line in FIG. 14 denotes the main memory 108.

In step 1404, the main processor 107 issues a transmit command to the I/O processor 109. This transmit command is registered in the transmit queue (not shown). The destination virtual address 1405 and the data length 1406 are also registered in the transmit queue.

In step 1407, the I/O processor 109 transfers the transmit command to the storage processor 117. Concretely, the I/O processor 109 transfers the virtual address 1405, the data size 1406, and the host ID 1408 at this time.

In step 1409, the storage processor 117 prepares for receiving data. When the storage processor 117 is enabled to receive the data, the storage processor 117 sends a notice for enabling data transfer to the I/O processor 109. The network layer control block 406 then refers to the address translation table 411 to identify the target disk cache address and instructs the data transfer control block 403 to transfer the data to the disk caches 119 and 120. The data transfer control block 403 then waits for data to be received from the I/O channel 104.

In step 1410, the I/O processor 109 sends the data 1411–1413 read from the main memory 108 to the storage processor 117. The data 1411-1413 is described in the address translation table 206 as physical addresses 302 and read by the data transfer control block 203 from the main memory 108, then sent to the I/O channel. On the other hand, in the storage processor 117, the data transfer control block 403 transfers the data received from the I/O channel 104 to both of the disk caches 119 and 120 according to the command issued from the network layer control block 406 in step 1409.

In step 1414, the data transfer completes, then the storage processor 117 reports the completion of the command process to the I/O processor 109.

In step 1415, the I/O processor 109 reports the completion of the data transfer to the main processor 107. This report is stored in the receive queue (not shown) beforehand.

Data transfer from the disk cache 119/120 to the main memory 108 is just the same as that shown in FIG. 14 except that the transfer direction is reversed.

Such way, the host processor 101/102 can store any data in any one or both of the disk caches 119 and 120. Next, a description will be made for one of the objects of the present invention, that is how to store log information in a disk cache. It is assumed here that the application program that runs in the host processor 101/102 has modified a file. The file modification is done in the main memory 108, thereby the data in the disk system 103 is updated every 30 seconds. This data updating is done to improve the performance of the system. However, if the host processor 101 fails before such the data updating is done in the disk system 103, the file conformity is not assured. This is why the operation records are stored in both of the disk caches 119 and 120 as a log respectively. A standby host processor that takes over a process from a failed one can thus restart the process according to the log information.

Figure 15:
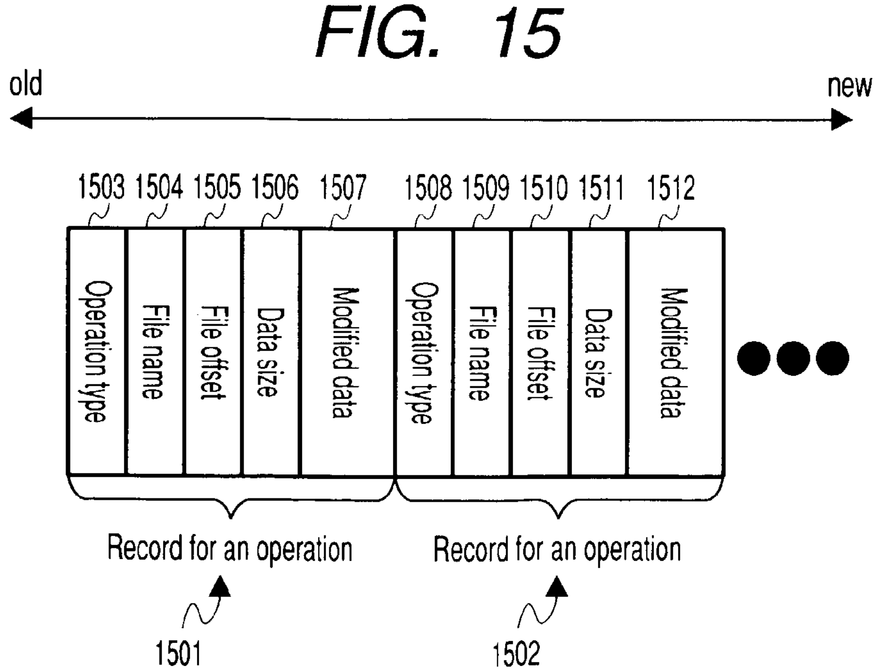
FIG. 15 is a concept chart for log contents.

FIG. 15 shows a log format. A record 1501 for one operation is composed of an operation type 1503 that describes an operation performed for a target file, a target file name 1504, an offset value 1505 from the start of the modified portion in the file, a data length 1506 of the modified portion, and modified data 1507. The records 1501 and 1502 for one operation respectively are recorded in a chronological order and the records 1501 and 1502 are deleted when the file modification is done in any of the disk drives 122–125. In a fail-over operation, such the file modification is not done in the disk drives. The records must be taken over from the failed host processor to a standby host processor.

Next, a description will be made for a fail-over operation performed in the computer system shown in FIG. 1 with use of the log shown in FIG. 15.

Figure 16:
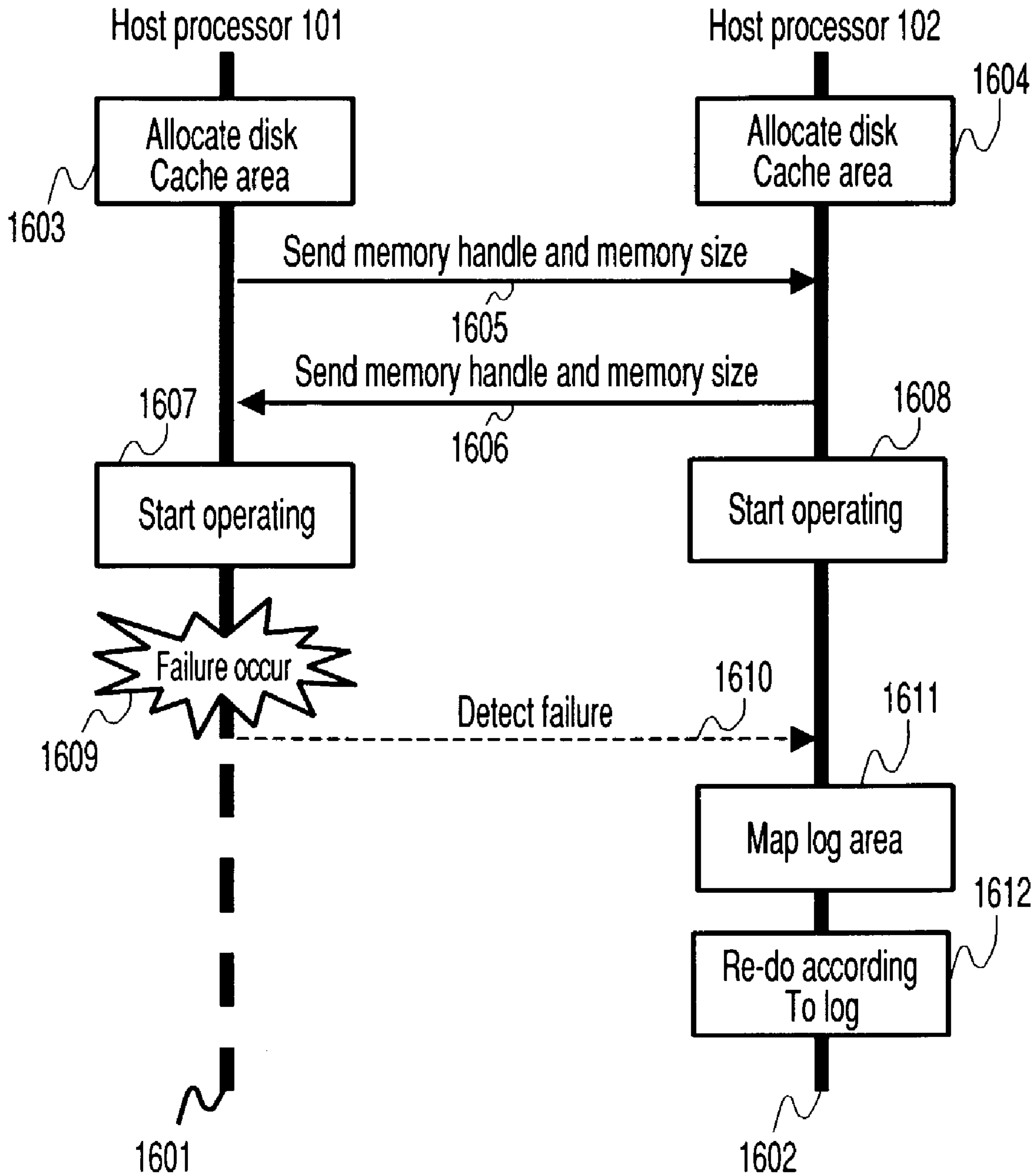
FIG. 16 is a ladder chart for operations of a host processor 101 performed upon a failure.

FIG. 16 shows a ladder chart for describing the operations of the host processors 101 and 102.

In step 1603, the host processor 101, when it is started up, allocates a log area in the disk caches 119 and 120.

In step 1604, the host processor 102, when it is started up, allocates a log area in the disk caches 119 and 120.

In step 1605, the host processor 101 sends both memory handle and size of the log area given from the disk system 103 to the host processor 102 through the LAN 106. The host processor 102 then stores the memory handle and the log area size. The memory handle is unique in the disk system 103, so that it is easy for the host processor 102 to identify the log area of the host processor 101.

In step 1606, the host processor 102 sends both memory handle and size of the log area given from the disk system 103 to the host processor 101 through the LAN 106. The host processor 101 then stores the memory handle and the size of the log area. The memory handle is unique in the disk system 103, so that it is easy for the host processor 101 to identify the log area of the host processor 102.

In step 1607, the host processor 101 begins its operation.

In step 1608, the host processor 102 begins its operation.

In step 1609, a failure occurs in the host processor 101, which thus stops the operation.

In step 1610, the host processor 102 detects the failure that has occurred in the host processor 101 by any means. Such the failure detecting means is generally a heart beat with which the subject means exchange signals between themselves periodically through a network. When one of the host processors has not received any signal from another one for a certain period, it decides that the latter has failed. The present invention does not depend on such the failure detecting means. Thus, no description will further be made for the failure detection.

In step 1611, the host processor 102 sends the memory handle of the log area of the host processor 101 to the storage processor 118 to map the log area into the virtual memory space of the host processor 102. The details of this procedure will be described later with reference to FIG. 17.

The host processor 102 can thus refer to the log area of the host processor 101 in step 1612. The host processor 102 then restarts the process according to the log information to keep the data matching. Then, the host processor 102 takes over the process from the host processor 101.

Figure 17:
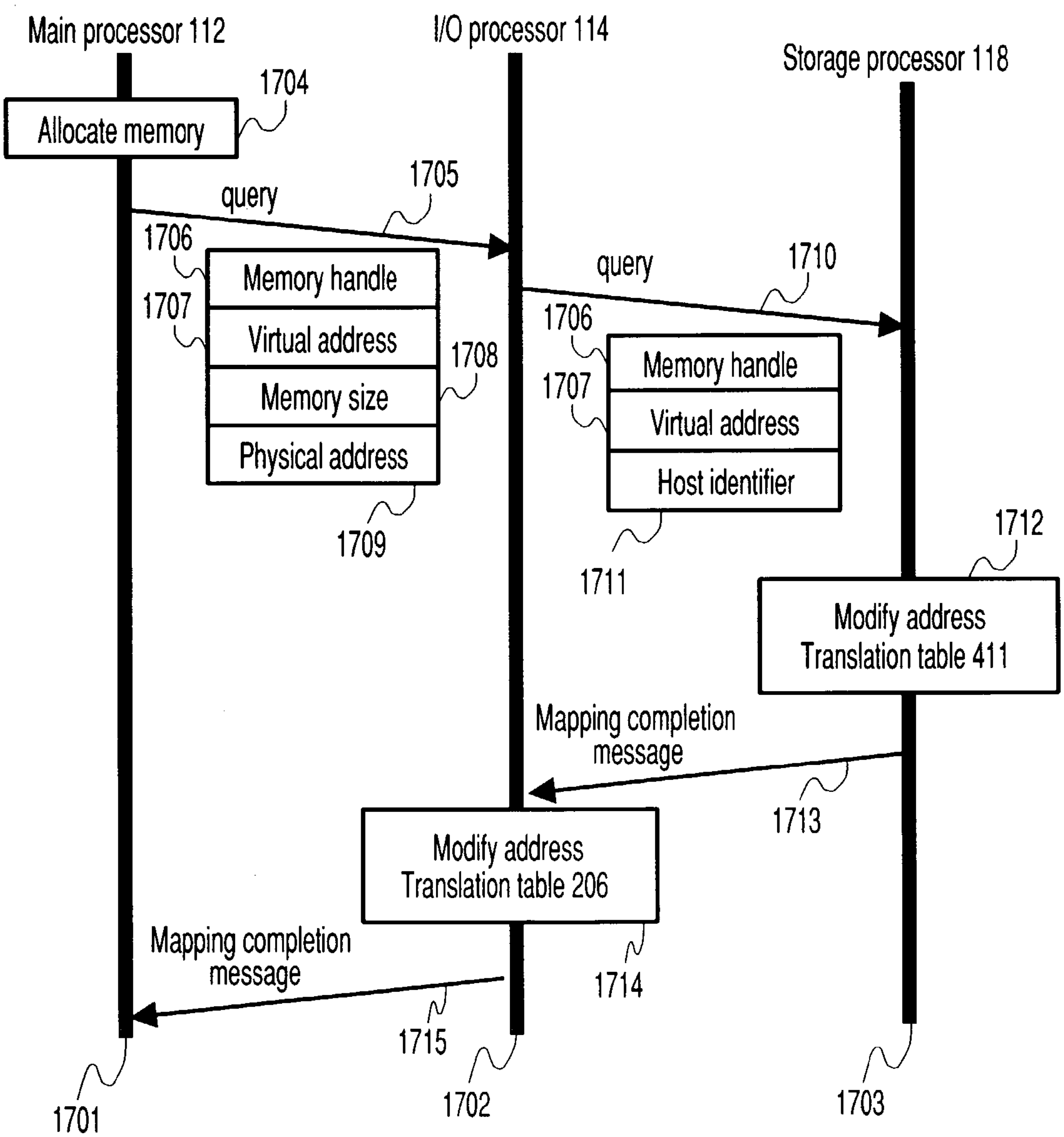
FIG. 17 is a ladder chart for a host processor 102 to map the log area of the host processor 101 in its own virtual memory space upon a failure detected in the host processor 101.

FIG. 17 shows the details of the process in step 1611.

In step 1704, the main processor 112 located in the host processor 102 allocates an area in the main memory 113 according to the log area size received from the host processor 101.

In step 1705, the main processor 112 sends a query to the I/O processor 114 about the log area of the host processor 101. The main processor 112 then sends the memory handle 1706 of the log area received from the host processor 101, the virtual address 1707 in which the log is to be mapped, the log area size 1708, the physical address 1709 in the main memory, which is allocated in step 1704, to the I/O processor 114 respectively.

In step 1710, the I/O processor 114 issues a query to the storage processor 118. The I/O processor 114 sends the memory handle 1706, the virtual address 1707, and the host ID 1711 to the storage processor 118 at this time.

In step 1712, the storage processor 118 refers to the exported segments control table 128 and check if the received memory handle 1706 is registered therein. If the memory handle 1706 is registered therein, the storage processor 118 copies the entry registered by the host processor 101 and changes the entry of the host ID 1002 to the host ID 1711 of the host processor 102 with respect to the copied entry. Then, the storage processor 118 sets the virtual address 1707 and the segment address of the log area obtained by referring to the exported segments control table 128 in the address translation table 411. The storage processor 118 then registers the received memory handle 1706 as a memory handle.

In step 1713, the mapping in the storage processor 118 completes together with the updating of the address translation table 411. The storage processor 118 thus reports the completion of the mapping to the I/O processor 114.

In step 1714, the I/O processor 114 updates the address translation table 206 and maps the log area in the virtual address space of the main processor 112.

In step 1715, the I/O processor 114 reports the completion of the mapping to the main processor 112.

<Second Embodiment>

While a description has been made for a fail-over operation performed between two host processors in a system configured as shown in FIG. 1, such the fail-over operation may also be done for storing log information with use of the method disclosed in the well-know example 1. In a cluster composed of three or more host processors, however, the method disclosed in the prior art 1 is required to send modified portions of a log to other host processors at each log modification in each host processor. Consequently, the log communication overhead becomes large and the system performance is often degraded.

Figure 18:
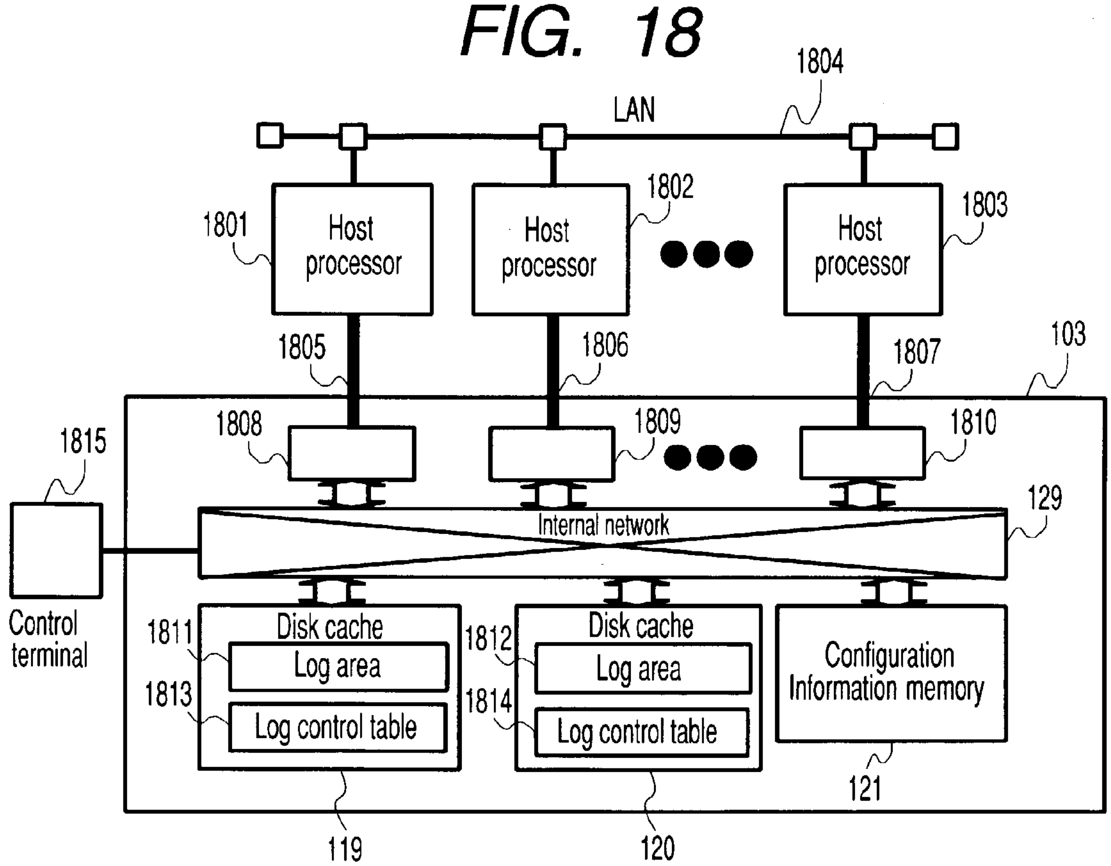
FIG. 18 is a block diagram of a computer system of the present invention, which includes three or more host processors.

FIG. 18 shows a computer system of the present invention. The host processors 1801 to 1803 can communicate with each another through a LAN 1804. The host processors 1801 to 1803 are connected to the storage processors 1808 to 1810 located in the disk system 103 through the I/O channels 1805 to 1807 respectively. The configuration of the disk system 103 is similar to that shown in FIG. 1 (disk drives are not shown here, however). The host processors 1801 to 1803 allocate log areas 1811 and 1812 in the disk caches 119 and 120. The log areas 1811 and 1812 are configured so as to have the same contents to improve the availability. The log control tables 1813 and 1814 for controlling the log areas 1811 and 1812 are also stored in the disk caches 119 and 120. The log control tables 1813 and 1814 are also configured so as to have the same contents to improve the availability. The disk system 103 is connected to a control terminal 1815, which is used by the user to change the configuration and the setting of the disk system 103, as well as to start up and shut down the disk system 103.

Figure 19:
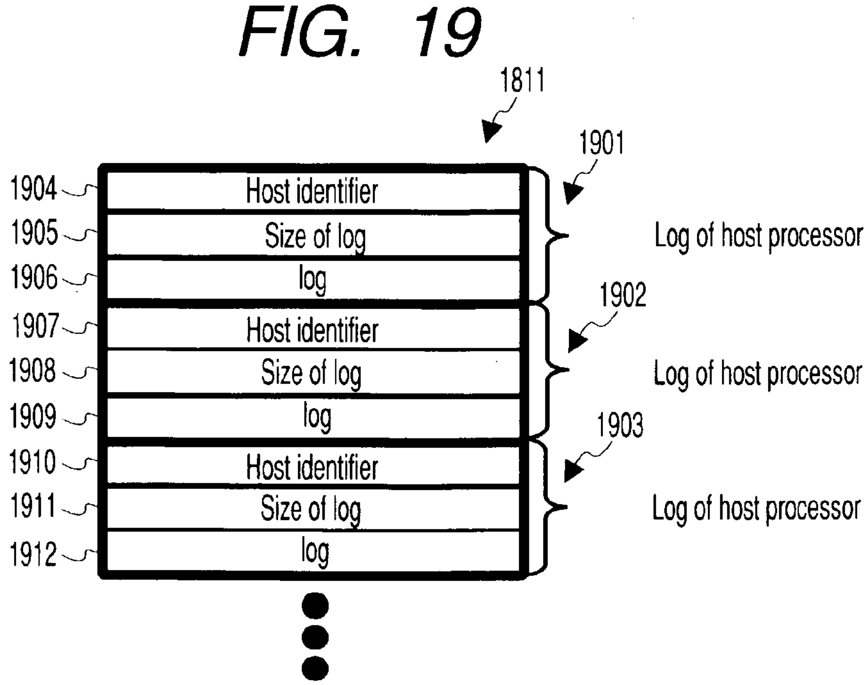
FIG. 19 is a concept chart for a log area 1811/1812.

FIG. 19 shows a configuration of the log area 1811. Each thick black frame denotes a log area of each host processor. The host ID 1904 describes the ID of a host processor that writes records in the log. The log size 1905 describes an actual size of a log. The log 1906 is a collection of actual process records. The log contents are the same as those shown in FIG. 15. This is also the same in both of the logs 1902 and 1903.

Figures 20, 21:
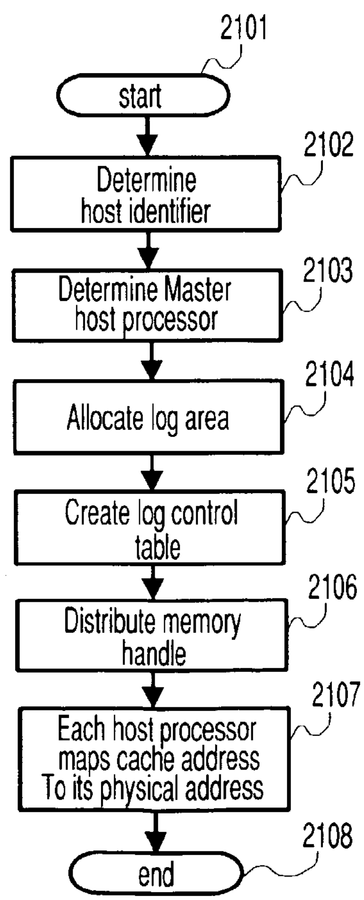
FIG. 20 is a log control table 1813/1814.
FIG. 21 is a flowchart of a start-up process of any one of the host processors 1801 to 1803.

FIG. 20 shows a log control table 1813. The log control table 1813 enables other host processors to refer to the log of a failed host processor. The host ID 2001 describes a log owner's host ID. The offset value 2002 describes an offset from the start of the log area 1811; the offset value 2002 denotes the log-stored address. The take-over host ID 2003 describes the host ID of a host processor that takes over a process from a failed host processor. The host processor that takes over a process decides if this entry is "null" (invalid). If it is "null", the host processor sets its own host ID here. If another host ID is set therein, it means that the host processor having the ID has already taken over the process. The host processor thus cancels the take-over process. This take-over host ID 2003 must be changed atomically.

FIG. 21 shows a flowchart for starting up any of the host processors 1801 to 1803.

In step 2101, the start-up process begins.

In step 2102, a host ID is assigned to each host processor by arbitration among the host processors 1801 to 1803.

In step 2103, one of the host processors 1801 to 1803 is selected and a log area is generated therein. In this embodiment, this selected host processor is referred to as the master host processor. This master host processor is usually decided according to the smallest or largest host ID number. In this embodiment, the host processor 1801 is selected as the master host processor.

In step 2104, the host processor 1801 allocates part of the disk cache 119/120 as a log area. The allocation procedure is the same as that shown in FIG. 12. A log area size 1811 is indispensable to allocate a log area. If each of the host processors 1801 to 1803 has a log area (1901 to 1903) fixed in size, the number of the host processors 1801 to 1803 in the computer system shown in FIG. 18 is known in step 2102, so that the size of the log area 1811 can be calculated.

In step 2105, the host processor 1801 creates log control tables 1813 and 1814 in the disk caches 119 and 120. The log area allocation procedure for the disk caches 119 and 120 is the same as that shown in FIG. 12.

In step 2106, the host processor 1801 distributes the log area 1811, as well as both memory handle and size of the log control table 1813 to each host processor. The memory handle is already obtained in steps 2104 and 2105, so that they can be distributed.

In step 2107, each of the host processors 1801 to 1803 maps the log area 1811 and the log control table 1813 into its virtual memory area. The mapping procedure is the same as that shown in FIG. 17. Consequently, the log area of each host processor comes to be shared by all the host processors.

Figure 22:
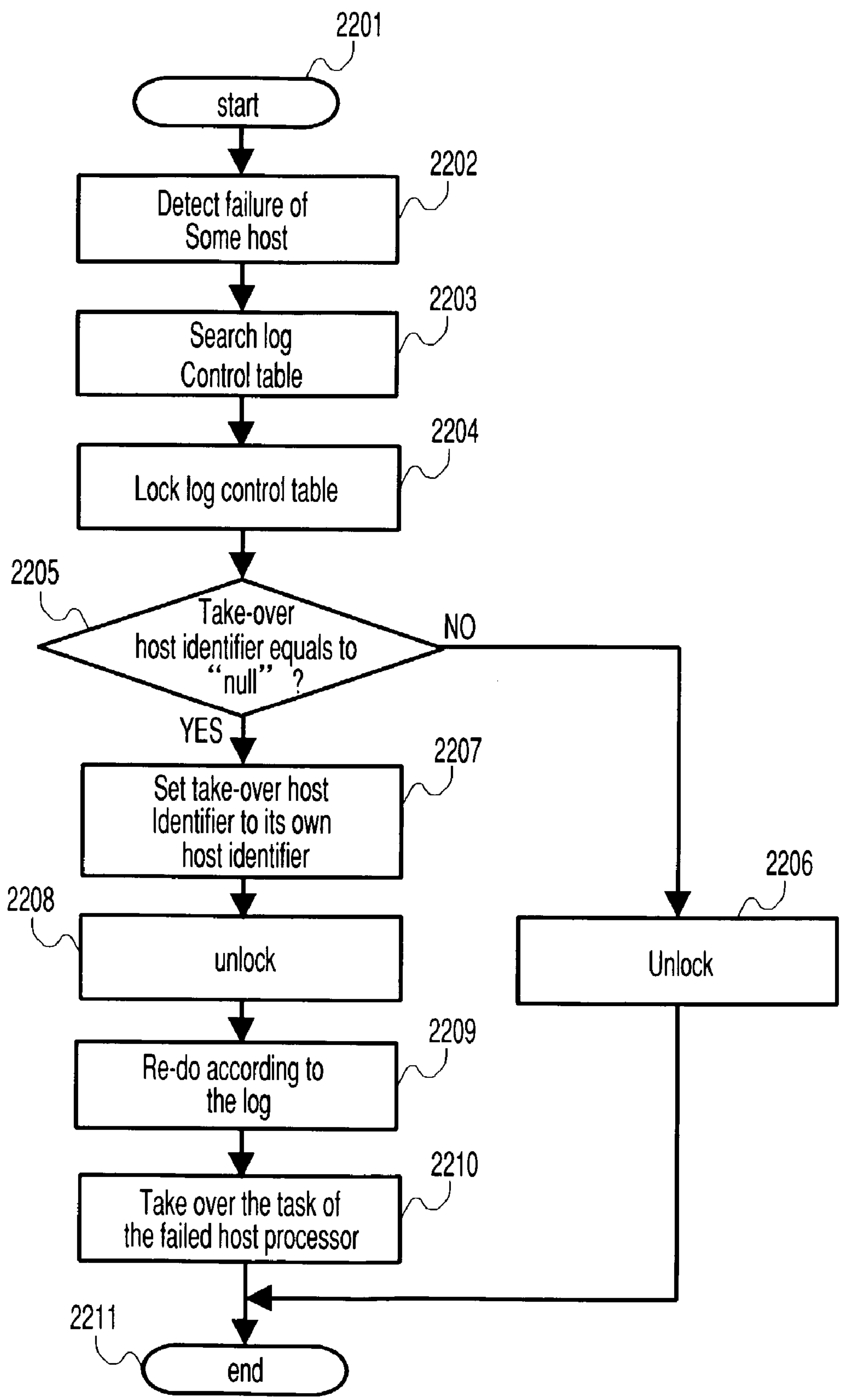
FIG. 22 is a flow chart of host processor's processes for a failure detected in another host processor.

FIG. 22 shows a flowchart of processes to be performed when one of the host processors 1801 to 1803 fails in a process.

In step 2201, the process begins.

In step 2202, a host processor (A) detects a failure that has occurred in another host processor (B). The failure detecting procedure is the same as that shown in FIG. 16.

In step 2203, the host processor (A) refers to the log control table 1813 to search the failed host processor entry therein.

In step 2204, the host processor (A) locks the entry of the target log control table 1813. This lock mechanism prevents the host processor (A) and another host processor (C) from updating the log control table 1813 at the same time.

In step 2205, the entry of the take-over host processor's ID 2003 is checked. If this entry is "null", the take-over is enabled. If another host processor's ID (D) is set therein, the host processor (D) is already performing the take-over process. The host processor (A) may thus cancel the take-over process.

In step 2206, if still another host processor (C) is already taking over the process, the host processor (A) unlocks the entry of the table 1813 and terminates the process.

In step 2207, if the take-over host ID is "null", the host processor (A) sets its host ID therein.

In step 2208, the table entry is unlocked.

In step 2209, the host processor (A) reads the log of the failed host processor (B). And the host processor (A) redo the failed host processor's operations according to the log.

In step 2210, if no problem arises from the data matching, the host processor (A) also perform the process of the failed host processor.

In step 2211, the process is ended.

If the disk caches 119 and 120 are mapped into the virtual address space of each of the host processors 1801 to 1803, the above-described effect is obtained. However, in this case, the capacity of each of the disk caches 119 and 120 usable for the input/output to/from the disk drives is reduced. And, this causes the system performance to be degraded. Therefore, it should be avoided to enable such the mapping limitlessly. This is why the disk cache capacity must be limited in this embodiment. The user can set such a disk cache capacity limit from the operation terminal.

Figure 23:
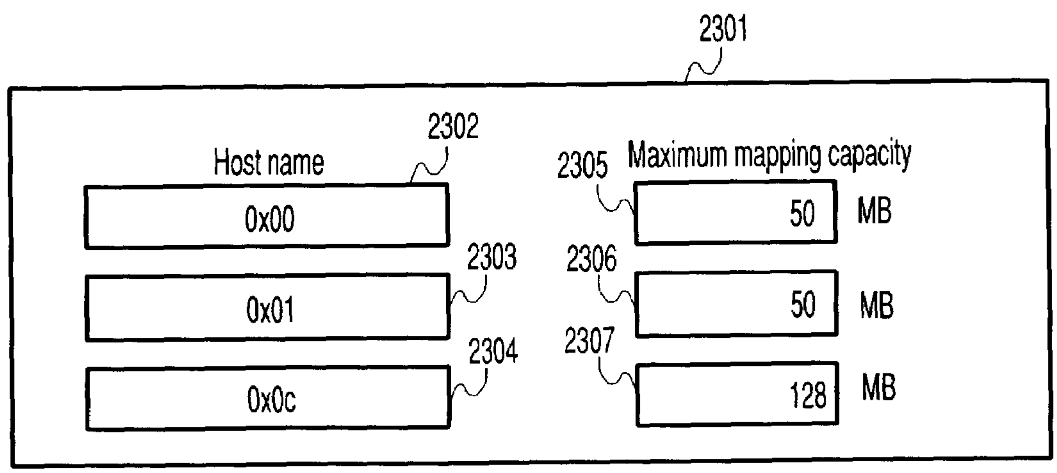
FIG. 23 is a concept chart for a setting screen of a control terminal 1815.

FIG. 23 shows a screen of the control terminal. Each of the host name fields 2302 to 2304 displays the host ID of a host processor having part of the disk cache 119/120 allocated in the virtual address space. Each of the maximum mapping capacity setting fields 2305 to 2307 displays the maximum capacity enabled to be mapped in the corresponding host processor. The user can thus set the maximum capacity for each host processor. And, due to such the setting is enabled, if the allocation request received from a host processor is over the maximum capacity, each of the storage processors 1808 to 1810 can check the maximum disk cache capacity setting area 2305 to 2307 so as not to allocate any disk cache to any of the host processors 1801 to 1803.

As described above, if a partial area of a disk cache is used as a log area to be shared and referred by all the host processors, it is possible to omit sending information of a log updated in a host processor to other host processors. The system can thus be improved in availability while it is prevented from performance degradation.

As described above, the disk cache is a non-volatile storage with a low overhead and it can be shared by and referred to from a plurality of host processors. In addition, it is suited for storing log information to improve the system availability while its performance degradation is suppressed.

What is claimed is:

1. A computer system, comprising:

a plurality of host processors;

a disk system; and a plurality of channels used for the connection between said disk system and each of said plurality of host processors, wherein each of said plurality of host processors includes a main processor and a main memory;

wherein said disk system includes a plurality of disk drives, a disk cache for storing at least a copy of part of the data stored in each of said disk drives, and a configuration information memory for storing at least part of the information used to denote the correspondence between a virtual address space of said main processor and a physical address space of said disk cache; and wherein an internal network used for the connection among said disk cache, said main processor, and said configuration information memory.

2. The computer system according to claim 1, wherein each of said plurality of host processors includes a first address translation table used to denote the correspondence between said virtual address space of said main processor and said physical address space of said main memory;

wherein said disk system includes a second address translation table used to denote the correspondence between said virtual address space of said main processor and said physical address space of said disk cache and an exported segments control table used to denote the correspondence between said physical address space of said disk cache and the identification (ID) of each of said plurality of host processors that uses said physical address space of said disk cache; and wherein said exported segments control table is stored in said configuration information memory.

3. The computer system according to claim 2, wherein each of said second address translation table and said exported segments control table includes an identifier of a physical address space of a mapped disk cache, so that said table can denote the correspondence between the ID of each of said plurality of host processors and said physical address space of said disk cache to be used by said plurality of host processors.

4. The computer system according to claim 2, wherein said physical address space of said disk cache used by a predetermined one of said host processors stores a log of said predetermined host processor.

5. The computer system according to claim 4, wherein said log is a copy of a log stored in said main memory of each of said plurality of host processors.

6. The computer system according to claim 1, wherein a plurality of channel interfaces are used for the connection between said plurality of host processors and said disk system.

7. The computer system according to claim 6, wherein each of said plurality of host processors uses one of the channel interfaces for the communication related to accesses to said disk cache area corresponding to part of its virtual address space.

8. The computer system according to claim 1, wherein each of said plurality of host processors and said disk system communicate with each other with use of a plurality of virtual connections established in one channel interface.

9. The computer system according to claim 8, wherein each of said plurality of host processors uses one of the virtual connections for the communication related to accesses to said disk cache corresponding to part of its virtual address space.

10. A disk system connected to one or more host processors, comprising:

a plurality of disk drives;

at least a disk cache for storing at least a copy of part of the data stored in said plurality of disk drives; and a control block used to denote the correspondence between a memory address in said disk cache and a virtual address in each of said plurality of host processors, wherein an area of said disk cache can be accessed as part of said virtual address space of each of said plurality of host processors.

11. The disk system according to claim 10, wherein said disk system further includes:

a disk cache control table used to denote the correspondence between the data stored in each of said plurality of disk drives and the data stored in said disk cache;

a free segments control table for controlling a free area in said disk cache; and an exported segments control table for controlling an area corresponding to part of said virtual address space of each of said plurality of host processors, which is an area of said disk cache.

12. The disk system according to claim 11, wherein said disk cache control table, said free segments control table, and said exported segments control table are stored in said control block; and wherein said control block is connected to each of said plurality of disk drives and said disk cache through an internal network.

13. The disk system according to claim 12, wherein said disk system further includes a storage processor for controlling said disk system and connecting each of said plurality of host processors to said internal network; and wherein said storage processor includes an address translation table used to denote the correspondence between said virtual address space of each of said plurality of host processors and said physical address space of said disk cache.

14. A method for controlling a disk cache of a computer system that includes a plurality of host processors, a plurality of disk drives, a disk cache for storing a copy of at least part of the data stored in said plurality of disk drives, and a connection path used for the connection among said host processors, said disk drives, and said disk cache, said method comprising the steps of:

denoting the correspondence between said physical address of said disk cache and said virtual address of each of said host processors; and accessing a partial area of said disk cache as part of said virtual address space of each of said host processors.

15. The method according to claim 14, wherein said step of denoting the correspondence between said physical address of said disk cache and said virtual address of each of said host processors includes the steps of:

(a) sending a virtual address and a size of a disk cache area requested from a host processor together with the ID of said host processor to request a disk cache area;

(b) referring to a first table for controlling free areas in said disk cache to search a free area therein;

(c) setting a unique identifier to said requested free area when a free area is found in said disk cache;

(d) registering both memory address and identifier of said free area in a second table for controlling areas corresponding to part of said virtual address space of each of said host processors;

(e) deleting the information related to said registered area from said first table for controlling free areas of said disk cache;

(f) registering a memory address of said area in said disk cache and its corresponding virtual address in a third table used to denote the correspondence between said virtual address space of each of said host processors and said disk cache;

(g) reporting successful allocation of said disk cache area in said virtual address space of said host processor to said host processor; and (h) sending an identifier of said registered area to said host processor.

16. The method according to claim 14, wherein said method further includes the steps of:

(a) enabling a host processor to which a disk cache area is allocated to send both identifier and size of said allocated area to other host processors;

(b) enabling each host processor that has received said identifier and size to send a virtual address to be corresponded to said received identifier, as well, as its ID to said disk system so that said disk cache area identified by said identifier is corresponded to said virtual address;

(c) enabling said disk system that has received said request to refer to said table for controlling said area corresponding to part of said virtual address space of each of said host processors;

(d) enabling said disk system to register said virtual address corresponding to said area address of said disk cache in said table used to denote the corresponding between said virtual address space of each of said host processors and said disk cache; and (e) enabling said disk system to report the successful allocation of said disk cache area in said virtual address of said host processor to said host processor.

17. The method according to claim 15, wherein said host processor logs its modification records of a file stored in said disk system, then stores said log in said disk cache area allocated in said virtual address space.

18. The method according to claim 17, wherein said method further includes the steps of:

(a) reading said log; and (b) modifying said file again according to said log records.

* * * * *